US012597269B2

(12) United States Patent
Kato

(10) Patent No.: US 12,597,269 B2
(45) Date of Patent: Apr. 7, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Daichi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 312 days.

(21) Appl. No.: 18/112,199

(22) Filed: Feb. 21, 2023

(65) Prior Publication Data
US 2023/0316778 A1 Oct. 5, 2023

(30) Foreign Application Priority Data
Mar. 29, 2022 (JP) ................................. 2022-053466

(51) Int. Cl.
*G06V 20/56* (2022.01)
*B60W 10/04* (2006.01)
(Continued)

(52) U.S. Cl.
CPC ........... *G06V 20/588* (2022.01); *B60W 10/04* (2013.01); *B60W 10/20* (2013.01);
(Continued)

(58) Field of Classification Search
CPC .... G06V 20/588; B60W 10/04; B60W 10/20; B60W 30/18009; B60W 2552/53;
(Continued)

(56) References Cited

U.S. PATENT DOCUMENTS

2014/0229106 A1* 8/2014 Ishikawa ................ G06V 20/20
701/533
2016/0272203 A1* 9/2016 Otake ............. B60W 30/18145
(Continued)

FOREIGN PATENT DOCUMENTS

| JP | 2020-126024 | 8/2020 |
|---|---|---|
| JP | 2020-163908 | 10/2020 |
| JP | 2021-020475 | 2/2021 |

OTHER PUBLICATIONS

Japanese Office Action for Japanese Patent Application No. 2022-053466 mailed Aug. 8, 2023.

*Primary Examiner* — Helal A Algahaim
*Assistant Examiner* — Karen Lynelle Furgason
(74) *Attorney, Agent, or Firm* — Amin, Turocy & Watson, LLP

(57) ABSTRACT

A vehicle control device according to an embodiment includes a recognizer that recognizes a surroundings situation of a host vehicle, and a driving controller that generates a target trajectory for the host vehicle on the basis of a recognition result of the recognizer, and controls one or both of speed and steering of the host vehicle so that the host vehicle travels along the generated target trajectory, and the driving controller generates the target trajectory so that a degree of interference between a demarcation line demarcating the main line side and the branch lane side and the target trajectory of the host vehicle is reduced when the host vehicle is caused to perform course change from the main line side to the branch lane side in a branch section in which a main line and a branch lane are connected.

7 Claims, 14 Drawing Sheets

(51) Int. Cl.
   *B60W 10/20* (2006.01)
   *B60W 30/18* (2012.01)
(52) U.S. Cl.
   CPC ... *B60W 30/18009* (2013.01); *B60W 2552/05* (2020.02); *B60W 2552/10* (2020.02); *B60W 2552/53* (2020.02); *B60W 2556/40* (2020.02); *B60W 2710/20* (2013.01); *B60W 2720/10* (2013.01)
(58) Field of Classification Search
   CPC ......... B60W 2552/05; B60W 2552/10; B60W 2556/40; B60W 2710/10; B60W 2710/20
   USPC ........................................................ 701/25
   See application file for complete search history.

(56) References Cited

U.S. PATENT DOCUMENTS

| | | | | |
|---|---|---|---|---|
| 2018/0186378 A1* | 7/2018 | Zhuang | ................ | G05D 1/0088 |
| 2019/0061819 A1* | 2/2019 | Park | ...................... | G05D 1/0212 |
| 2019/0359209 A1* | 11/2019 | Mizutani | ......... | B60W 30/18163 |
| 2020/0125861 A1* | 4/2020 | Sota | ..................... | B62D 15/025 |
| 2020/0247413 A1* | 8/2020 | Fukuda | ................ | B60W 30/10 |
| 2020/0269880 A1* | 8/2020 | Tokita | .................... | G08G 1/167 |
| 2020/0307594 A1 | 10/2020 | Kato et al. | | |
| 2020/0388157 A1* | 12/2020 | Fukushige | ............ | G08G 1/166 |
| 2021/0024065 A1 | 1/2021 | Mizoguchi | | |
| 2021/0181741 A1* | 6/2021 | Yao | ...................... | G05D 1/0214 |
| 2021/0403045 A1* | 12/2021 | Lin | ........................ | G08G 1/166 |
| 2023/0311868 A1* | 10/2023 | Varnier | ................ | B60W 30/12 |
| | | | | 701/41 |

* cited by examiner

Figure 2:
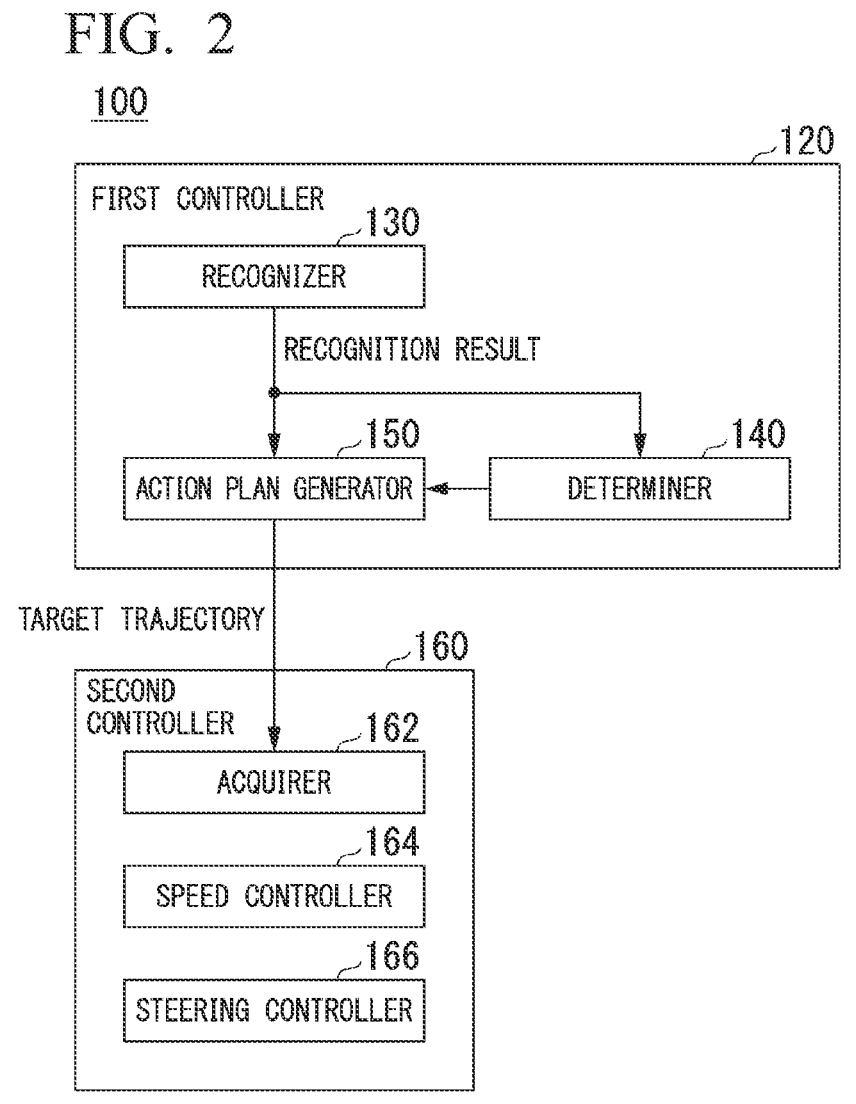

FIRST CONTROLLER

130
RECOGNIZER

RECOGNITION RESULT

150
ACTION PLAN GENERATOR

140
DETERMINER

TARGET TRAJECTORY

160
SECOND CONTROLLER

162
ACQUIRER

164
SPEED CONTROLLER

166
STEERING CONTROLLER

FIG. 8

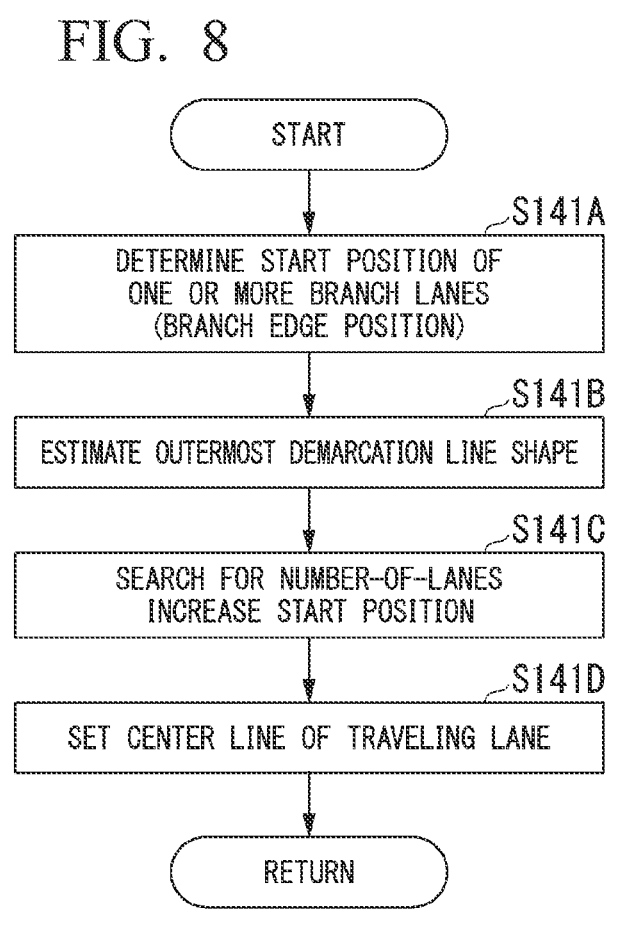

START

S141A
DETERMINE START POSITION OF
ONE OR MORE BRANCH LANES
(BRANCH EDGE POSITION)

S141B
ESTIMATE OUTERMOST DEMARCATION LINE SHAPE

S141C
SEARCH FOR NUMBER-OF-LANES
INCREASE START POSITION

S141D
SET CENTER LINE OF TRAVELING LANE

RETURN

FIG. 10

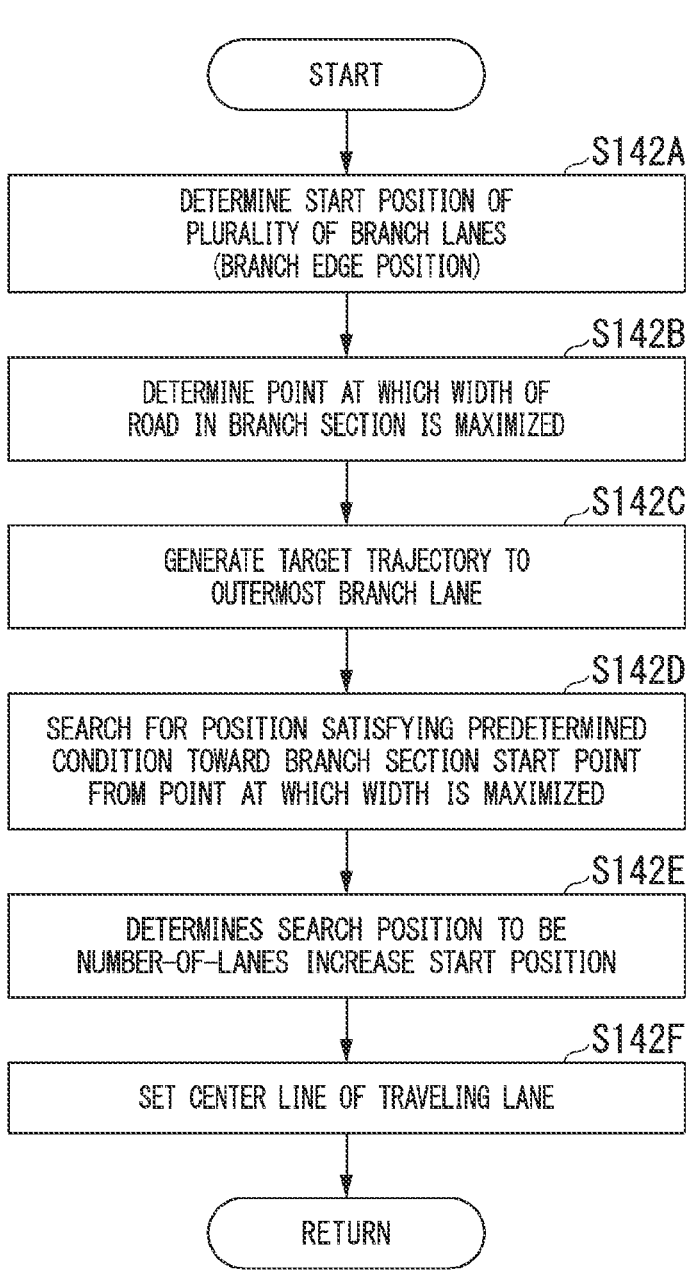

START

S142A

DETERMINE START POSITION OF
PLURALITY OF BRANCH LANES
(BRANCH EDGE POSITION)

S142B

DETERMINE POINT AT WHICH WIDTH OF
ROAD IN BRANCH SECTION IS MAXIMIZED

S142C

GENERATE TARGET TRAJECTORY TO
OUTERMOST BRANCH LANE

S142D

SEARCH FOR POSITION SATISFYING PREDETERMINED
CONDITION TOWARD BRANCH SECTION START POINT
FROM POINT AT WHICH WIDTH IS MAXIMIZED

S142E

DETERMINES SEARCH POSITION TO BE
NUMBER-OF-LANES INCREASE START POSITION

S142F

SET CENTER LINE OF TRAVELING LANE

RETURN

FIG. 12

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2022-053466, filed on Mar. 29, 2022, the content of which is incorporated herein by reference.

BACKGROUND

Field of the Invention

The present invention relates to a vehicle control device, a vehicle control method, and a storage medium.

Description of Related Art

In the related art, a technology for recognizing a road demarcation line that demarcates a lane in which a vehicle is traveling, generating a target trajectory with reference to the recognized demarcation line, and causing the vehicle to automatically travel along the generated target trajectory is known (for example, Japanese Unexamined Patent Application, First Publication No 2020-126024).

SUMMARY

However, since a demarcation line demarcating a main lane and a branch lane branching from the main lane may not be present in a branch section in which there are the main lane and the branch lane, an appropriate target trajectory may not be able to be generated and appropriate vehicle driving control may not be performed.

Aspects of the present invention have been made in consideration of such circumstances, and one object thereof is to provide a vehicle control device, a vehicle control method, and a storage medium capable of performing more appropriate driving control in a branch section.

A vehicle control device, vehicle control method, and storage medium according to the present invention adopt the following configurations.

(1): A vehicle control device according to an aspect of the present invention is a vehicle control device including: a recognizer configured to recognize a surroundings situation of a host vehicle on the basis of information obtained from at least one of a detection device and map information; and a driving controller configured to generate a target trajectory for the host vehicle on the basis of a recognition result of the recognizer, and control one or both of speed and steering of the host vehicle so that the host vehicle travels along the generated target trajectory, wherein the driving controller generates the target trajectory so that a degree of interference between a demarcation line demarcating the main line side and the branch lane side and the target trajectory of the host vehicle is reduced when the host vehicle is caused to perform course change from the main line side to the branch lane side in a branch section in which a main line and a branch lane are connected.

(2): In the aspect (1), the recognizer sets a virtual demarcation line on the branch lane side on the basis of information on a demarcation line on the main line side in the branch section when the recognizer does not recognize the demarcation line demarcating the main lane side and the branch lane side, and the driving controller generates a target trajectory for the host vehicle so that a degree of interference with the virtual demarcation line set by the recognizer is reduced.

(3): In the aspect (1), the driving controller generates the target trajectory so that a degree of interference between respective target trajectories for the course change from the main lane side to respective branch lanes is reduced when there are a plurality of branch lanes.

(4): In the aspect (1), the driving controller determines a number-of-lanes increase start position in the branch section on the basis of a road shape in the branch section, and generates a target trajectory passing through the number-of-lanes increase start position from a position of the host vehicle and traveling in a center of the branch lane.

(5): In the aspect (4), the number-of-lanes increase start position is a position at which a distance from the demarcation line demarcating the main lane side and the branch lane side in the branch section is equal to or larger than a predetermined value.

(6): In the aspect (5), the predetermined value is half the width of the host vehicle.

(7): In the aspect (4), recognizer determines a number-of-lanes increase end position in the branch section, the driving controller generates the target trajectory so that the target trajectory passes through the number-of-lanes increase start position and the number-of-lanes increase end position and reaches the branch lane.

(8): In the aspect (7), the number-of-lanes increase end position is set to a position at which a degree of interference between target trajectories for travel in respective branch lanes is reduced when there are a plurality of branch lanes.

(9): A vehicle control method according to an aspect of the present invention is a vehicle control method including: recognizing, by a computer, a surroundings situation of a host vehicle on the basis of information obtained from at least one of a detection device and map information; generating, by the computer, a target trajectory for the host vehicle on the basis of a recognition result, and executing driving control for controlling one or both of speed and steering of the host vehicle so that the host vehicle travels along the generated target trajectory; and generating, by the computer, the target trajectory so that a degree of interference between a demarcation line demarcating the main line side and the branch lane side and the target trajectory of the host vehicle is reduced when the host vehicle is caused to perform course change from the main line side to the branch lane side in a branch section in which a main line and a branch lane are connected.

(10): A storage medium according to an aspect of the present invention is a computer-readable non-transitory storage medium having a program stored therein, the program causing a computer to: recognize a surroundings situation of a host vehicle on the basis of information obtained from at least one of a detection device and map information; generate a target trajectory for the host vehicle on the basis of a recognition result, and execute driving control for controlling one or both of speed and steering of the host vehicle so that the host vehicle travels along the generated target trajectory; and generate the target trajectory so that a degree of interference between a demarcation line demarcating the main line side and the branch lane side and the target trajectory of the host vehicle is reduced when the host vehicle is caused to perform course change from the main line side to the branch lane side in a branch section in which a main line and a branch lane are connected.

According to the aspects (1) to (10), it is possible to perform more appropriate driving control in the branch section.

BRIEF DESCRIPTION OF THE DRAWINGS

FIG. 2 is a functional configuration diagram of a first controller and a second controller.

FIG. 8 is a flowchart showing an example of processing for estimating a branch lane shape in the first embodiment.

FIG. 10 is a flowchart showing an example of processing for estimating a branch lane shape in the second embodiment.

FIG. 12 is a diagram for describing a number-of-lanes increase end position determined in the first road shape pattern.

DESCRIPTION OF EMBODIMENTS

Hereinafter, embodiments of a vehicle control device, a vehicle control method, and a storage medium of the present invention will be described with reference to the drawings. Hereinafter, an embodiment in which the vehicle control device is applied to an automated driving vehicle will be described by way of example. The automated driving is, for example, to automatically control one or both of steering and acceleration or deceleration of a vehicle to execute driving control. Examples of the driving control of the vehicle may include various driving assistance such as lane keeping assistance system (LKAS), adaptive cruise control (ACC), and auto lane changing (ALC). The automated driving vehicle may be a vehicle whose driving is partially or wholly controlled by manual driving of an occupant (driver). Hereinafter, a case in which a left-hand traffic regulation is applied will be described, but right and left may be reversed when a right-hand traffic regulation is applied.

First Embodiment

[Overall Configuration]

Figure 1:
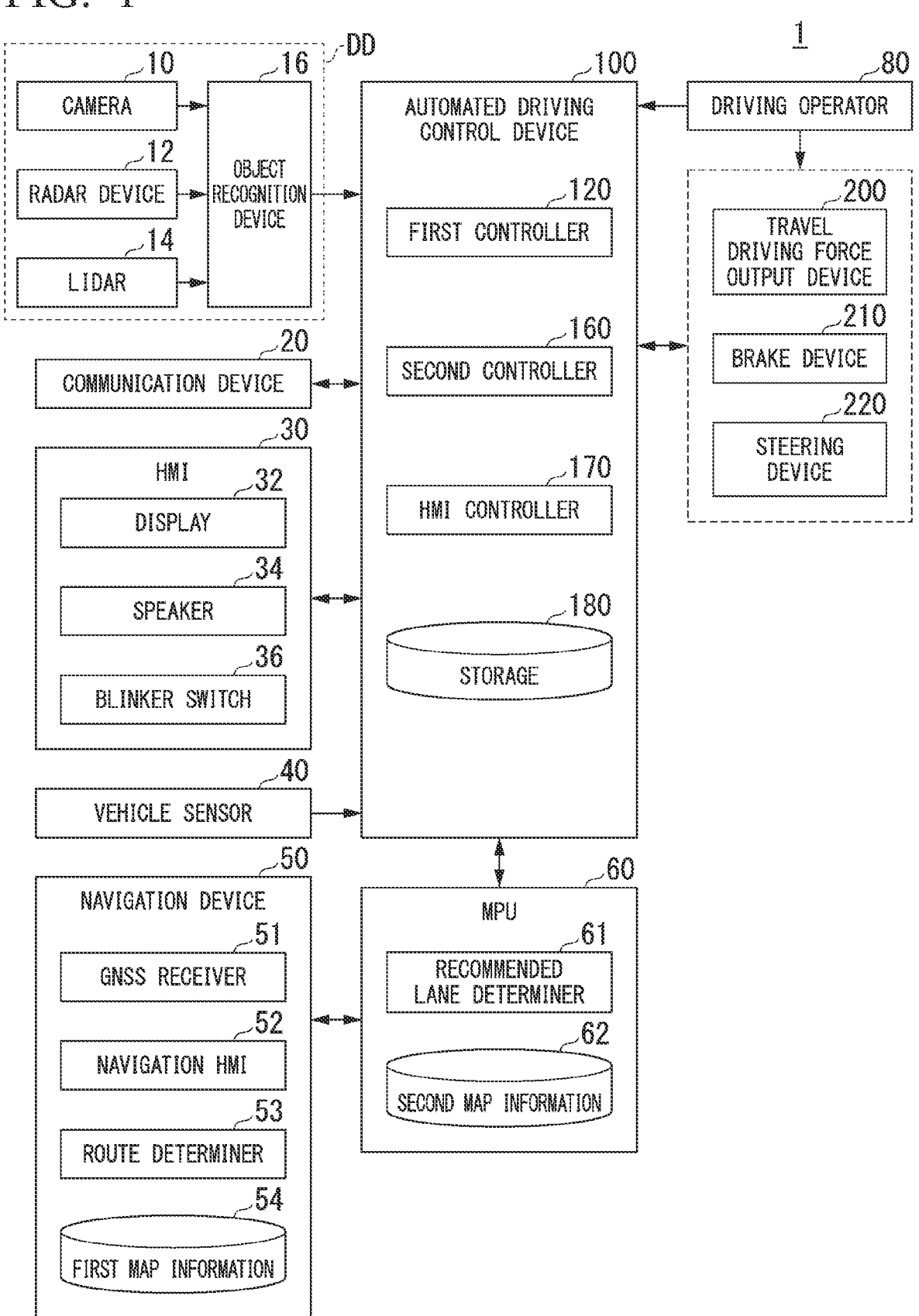
FIG. 1 is a diagram showing an example of a configuration of a vehicle system on which a vehicle control device is mounted according to a first embodiment.

FIG. 1 is a diagram showing an example of a configuration of a vehicle system 1 on which a vehicle control device is mounted according to a first embodiment. A vehicle on which the vehicle system 1 is mounted (hereinafter referred to as a host vehicle M) is, for example, a vehicle such as a two-wheeled vehicle, a three-wheeled vehicle, or a four-wheeled vehicle, and a driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and a part of the configuration may be omitted or other configurations may be added thereto. The automated driving control device 100 is an example of a "vehicle control device". A combination of the camera 10, the radar device 12, the LIDAR 14, and the object recognition device 16 is an example of a "detection device DD". The HMI 30 is an example of an "output device".

The camera 10 is, for example, a digital camera using a solid-state imaging device such as a charge coupled device (CCD) or a complementary metal oxide semiconductor (CMOS). The camera 10 is attached to any location on a host vehicle M. When a forward side is imaged, the camera 10 is attached to, for example, an upper portion of a front windshield, a rear surface of a rearview mirror, or the like. When a backward side of the host vehicle M is imaged, the camera 10 is attached to an upper portion of a rear windshield, a back door, or the like. When a sideward side and a rear sideward side of the host vehicle M are imaged, the camera 10 is attached to a door mirror or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and orientation) of the object. The radar device 12 is attached to any location on the host vehicle M. The radar device 12 may detect a position and a speed of the object using a frequency modulated continuous wave (FM-CW) scheme.

The LIDAR 14 irradiates the surroundings of the host vehicle M with light (or an electromagnetic wave having a wavelength close to that of light) and measures scattered light. The LIDAR 14 detects a distance to a target on the basis of a time from light emission to light reception. The light to be radiated is, for example, pulsed laser light. The LIDAR 14 is attached to any location on the host vehicle M.

The object recognition device 16 performs sensor fusion processing on detection results of some or all of the camera 10, the radar device 12, and the LIDAR 14 to recognize a position, type, speed, and the like of the object. The object recognition device 16 outputs recognition results to the automated driving control device 100. The object recognition device 16 may output detection results of the camera 10, the radar device 12, and the LIDAR 14 as they are to the automated driving control device 100. In this case, the object recognition device 16 may be omitted from the vehicle system 1.

The communication device 20, for example, communicates with another vehicle present around the host vehicle M using a cellular network, a Wi-Fi network, Bluetooth (registered trademark), dedicated short range communication (DSRC), or the like or communicates with various server devices via a wireless base station.

The HMI 30 presents various types of information to a user of the host vehicle M and receives an input operation from the user. Examples of the user include a driver who drives the host vehicle M and an occupant such as a fellow passenger. In the following description, the term "occupant" will be used unless otherwise specified. The HMI 30 includes, for example, a display 32, a speaker 34, and a blinker switch 36. The HMI 30 may include buzzers, a touch panel, switches, keys, microphones, and the like.

The display 32 is, for example, located under the front windshield and provided in a dashboard provided in front of a seat of the driver and a seat of a front occupant in a vehicle cabin. The display 32 may be provided near the front of the seat of the driver (a seat closest to a steering wheel), for example, and installed at a position visible to the driver through a gap in the steering wheel or through the steering wheel.

The display 32 is, for example, any of various display devices such as a liquid crystal display (LCD) and an organic electro luminescence (EL) display. The display 32 displays an image output by an HMI controller 170, which will be described later. The display 32 may be a touch panel that receives an operation of the occupant on a screen. The display 32 may function as an instrument panel (meter display) that displays instruments such as a speedometer and a tachometer.

At least one speaker 34 is installed in the vehicle cabin. The speaker 34 outputs a voice, a warning sound, or the like under the control of the HMI controller 170, for example.

The blinker switch 36 is provided, for example, on a steering column or a steering wheel. The blinker switch 36 is an example of an operator that receives an instruction from the driver to perform lane change of the host vehicle M, for example. The blinker switch 36, for example, may be a blinker lever or may be a blinker button. For example, when the driver operates the blinker switch 36 in a direction in which the lane change (course change) of the host vehicle M is performed (a direction in which the host vehicle M moves), a direction indicator (for example, a blinker (a blinker outside the vehicle)) indicating the direction in which the host vehicle M moves, to the surroundings, blinks.

The vehicle sensor 40 includes, for example, a vehicle speed sensor that detects a speed of the host vehicle M, an acceleration sensor that detects an acceleration, a yaw rate sensor that detects an angular speed around a vertical axis, and an orientation sensor that detects a direction of the host vehicle M. The vehicle sensor 40 may include a position sensor that acquires a position of the host vehicle M. The position sensor is, for example, a sensor that acquires position information (longitude and latitude information) from a global positioning system (GPS) device. The position sensor may be a sensor that acquires the position information using a global navigation satellite system (GNSS) receiver 51 of the navigation device 50.

The navigation device 50 includes, for example, the GNSS receiver 51, a navigation HMI 52, and a route determiner 53. The navigation device 50 holds first map information 54 in a storage device such as a hard disk drive (HDD) or a flash memory. The GNSS receiver 51 specifies the position of the host vehicle M on the basis of a signal received from a GNSS satellite. The position of the host vehicle M may be specified or complemented by an inertial navigation system (INS) using an output of the vehicle sensor 40. The navigation HMI 52 includes a display device, a speaker, a touch panel, keys, and the like. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guidance using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for travel to a branch destination when there is a branch location in the on-map route.

The second map information 62 is map information with higher accuracy than the first map information 54. The second map information 62 includes, for example, information on a center of the lane or information on a boundary of the lane. The second map information 62 may include information on the number of lanes or a width (lane width) of a road. The second map information 62 may include information indicating a branch section in which a main lane and a branch lane are connected, and information indicating a merging section in which the main lane and a merging lane that merges into the main lane are connected. The information indicating the branch section includes, for example, position information of a start point and an end point of the branch section, the number of branch lanes, and lane connection information indicating how the lanes are connected. The information indicating the merging section includes, for example, position information of a start point and an end point of the merging section. The second map information 62 includes, for example, information on a position of a connection edge (nose) of a lane in the branch section or the merging section or a position of a zebra zone (traffic zone) or a no-entry area, information indicating whether or not there is a road demarcation line (hereinafter referred to as a demarcation line) that demarcates the main lane and another lane (a branch lane or a merging lane), and shape information of the branch section or the merging section. The connection end includes, for example, a soft nose and a hard nose. The second map information 62 may include road information, traffic regulation information, address information (an address and postal code), facility information, telephone number information, and the like. The second map information 62 may be updated at any time by the communication device 20 communicating with another device.

The driving operator 80 includes, for example, an accelerator pedal, a brake pedal, a shift lever, a steering wheel, a deformed steering wheel, a joystick, and other operators. A sensor that detects an amount of operation or the presence or absence of the operation is attached to the driving operator 80, and a result of the detection is output to the automated driving control device 100 or some or all of the travel driving force output device 200, the brake device 210, and the steering device 220.

The automated driving control device 100 includes, for example, a first controller 120, a second controller 160, the HMI controller 170, and a storage 180. The first controller 120, the second controller 160, and the HMI controller 170 are realized, for example, by a hardware processor such as a central processing unit (CPU) executing a program (software). Some or all of these components may be realized by hardware (circuit; including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device (a storage device including a non-transitory storage medium) such as an HDD or a flash memory of the automated driving control device 100 in advance or may be stored in a detachable storage medium such as a DVD or a CD-ROM and installed in the HDD or flash memory of the automated driving control device 100 by the storage medium (a non-transitory storage medium) being mounted in a drive device. The automated driving control device 100 is an example of a "vehicle control device".

The storage 180 may be realized by various storage devices described above, a solid state drive (SSD), an electrically erasable programmable read only memory (EEPROM), a read only memory (ROM), a random access memory (RAM), or the like. Information necessary for execution of the driving control in the first embodiment, programs, and various types of other information, for example, are stored in the storage 180. The storage 180 may store map information (the first map information 54 and the second map information 62).

FIG. 2 is a functional configuration diagram of the first controller 120 and the second controller 160. The first controller 120 realizes, for example, a function using artificial intelligence (AI) and a function using a previously given model in parallel. For example, a function of "recognizing an intersection" may be realized by recognition of the intersection using deep learning or the like and recognition based on previously given conditions (there is a signal which can be subjected to pattern matching, a road sign, or the like) being executed in parallel and scored for comprehensive evaluation. Accordingly, the reliability of automated driving is ensured. The first controller 120 includes, for example, a recognizer 130, a determiner 140, and an action plan generator 150. A combination of the determiner 140, the action plan generator 150, and the second controller 160 is an example of the "driving controller".

The recognizer 130 recognizes the surroundings situation of the host vehicle M on the basis of information obtained from at least one of the detection device DD and the map information. For example, the recognizer 130 recognizes a state such as a position, speed, and acceleration of an object around the host vehicle M (for example, within a predetermined distance from the host vehicle M) on the basis of the information acquired from the detection device DD. Examples of the object include other vehicles, traffic participants on a road (pedestrians, bicycles, or the like), road structures, and other surrounding objects. Examples of the road structure include a road sign, a traffic light, a railroad crossing, a curb, a median, a guardrail, and a fence. Examples of the road structure may include a road surface sign such as a demarcation line drawn or affixed on a road surface that demarcates the road, a pedestrian crossing, a bicycle crossing, a stop line, a zebra zone (traffic zone), or a no-entry area, and a connection edge (a soft nose or hard nose) of the lane. The position of the object, for example, is recognized as a position at absolute coordinates with a representative point (a centroid, a drive shaft center, or the like) of the host vehicle M as an origin, and is used for control. The position of the object may be indicated by a representative point such as a centroid or a corner of the object or may be indicated by a represented area. In the following description, it is assumed that the representative point of the host vehicle M is the centroid. When the object is another vehicle, the "status" of the object may include an acceleration or jerk of the object, or an "action status" (for example, whether or not the object is changing lanes or is about to change lanes). The recognizer 130 may recognize a relative distance (a residual distance) to the object.

The recognizer 130, for example, recognizes the number of lanes of a road on which the host vehicle M is traveling or the traveling lane (host vehicle lane) on the basis of the information acquired from the detection device DD. In this case, the recognizer 130 may compare a pattern (for example, a line type or layout of solid lines and dashed lines) of a demarcation line obtained from the second map information 62 with a pattern of a demarcation line around the host vehicle M recognized from an image captured by the camera 10 to recognize the traveling lane. The recognizer 130 may recognize a lane boundary (road boundary) of a road structure as well as the demarcation lines to recognize the traveling lane. In this recognition, the position of the host vehicle M acquired from the navigation device 50 or a processing result of the INS may be taken into consideration.

The recognizer 130 recognizes a position or posture of the host vehicle M with respect to the traveling lane when recognizing the traveling lane. The recognizer 130 may recognize, for example, a deviation of a reference point of the host vehicle M from a center of the lane and an angle formed between a traveling direction of the host vehicle M and a line connecting along the center of the lane as a relative position and posture of the host vehicle M with respect to the traveling lane. Instead, the recognizer 130 may recognize, for example, a position of the reference point of the host vehicle M with respect to any one side edge (the demarcation line or the road boundary) of the traveling lane as the relative position of the host vehicle M with respect to the traveling lane. The recognizer 130 recognizes a stop line, an obstacle, a traffic light, a toll booth, and other road events.

The recognizer 130 recognizes a branch section present in front of the host vehicle M, the lane connection information in the branch section, and various types of information for travel in the branch section, such as lane type. A function of the recognizer 130 in this case will be described in detail later.

The determiner 140 performs various determination processing such as a determination as to whether or not the occupant of the host vehicle M is notified of predetermined information, a determination as to whether a blinker (a direction indicator) mounted on the host vehicle M is to be operated, and a determination as to whether lateral movement for course change (lane change) from the main lane side to the branch lane side is to be started, on the basis of the recognition result of the recognizer 130. A function of the determiner 140 will be described in detail later.

The action plan generator 150 generates a target trajectory along which the host vehicle M will travel in the future automatically (without depending on an operation of a driver) so that the host vehicle M can basically travel in the recommended lane determined by the recommended lane determiner 61 and cope with a surroundings situation of the host vehicle M, on the basis of the recognition result of the recognizer 130 or the determination result of the determiner 140. The target trajectory includes, for example, a speed element. For example, the target trajectory is represented as a sequence of points (trajectory points) to be reached by the host vehicle M. The trajectory point is a point that the host vehicle M is to reach for each predetermined traveling distance (for example, several meters) along a road, and a target speed and a target acceleration at every predetermined sampling time (for example, every several tenths of a [sec]) are separately generated as a part of the target trajectory. The trajectory point may be a position to be reached by the host vehicle M at the sampling time at every predetermined sampling time. In this case, information on the target speed or the target acceleration is represented by an interval between the trajectory points.

When the action plan generator 150 generates the target trajectory, the action plan generator 150 may set an event of automated driving. Examples of the automated driving event include a constant speed traveling event, a low speed following traveling event, a lane changing event, a branching event, a merging event, a takeover event, and an emergency stop event. The action plan generator 150 generates a target trajectory according to an activated event. The action plan generator 150 performs, for example, adjustment of the speed of the host vehicle M or adjustment of an amount of lateral movement of the host vehicle M when generating the target trajectory. A function of the action plan generator 150 will be described in detail later.

The second controller 160 controls the travel driving force output device 200, the brake device 210, and the steering device 220 so that the host vehicle M passes through the target trajectory generated by the action plan generator 150 at a scheduled time.

The second controller 160 includes, for example, an acquirer 162, a speed controller 164, and a steering controller 166. The acquirer 162 acquires information on the target trajectory (trajectory points) generated by the action plan generator 150 and stores the information on the target trajectory in a memory (not shown). The speed controller 164 controls the travel driving force output device 200 or the brake device 210 on the basis of a speed element incidental to the target trajectory stored in the memory. The steering controller 166 controls the steering device 220 according to a bent state of the target trajectory stored in the memory. Processing of the speed controller 164 and the steering controller 166 is realized by, for example, a combination of feedforward control and feedback control. For example, the steering controller 166 executes a combination of feedforward control according to a curvature of a road in front of the host vehicle M with feedback control based on a deviation from the target trajectory.

The HMI controller 170 uses the HMI 30 to notify the occupant of predetermined information. Examples of the predetermined information include information related to traveling of the host vehicle M, such as information on a state of the host vehicle M or information on driving control. Examples of the information on the state of the host vehicle M include a speed of the host vehicle M, an engine speed, and a shift position. Examples of the information on the driving control include an inquiry as to whether or not to change lanes, information imposed on the occupant required for switching from automated driving to manual driving or the like (task request information for the occupant), and information on a situation of driving control (for example, content of an event that is being executed). The predetermined information may include information irrelevant to travel control of the host vehicle M, such as TV programs, and content (for example, movies) stored in a storage medium such as a DVD.

For example, the HMI controller 170 may generate an image including the above-described predetermined information and cause the generated image to be displayed on the display 32 of the HMI 30 or may generate a sound indicating the predetermined information and cause the generated sound to be output from the speaker 34 of the HMI 30. The HMI controller 170 may output the information received by the HMI 30 to the communication device 20, the navigation device 50, the first controller 120, and the like.

The travel driving force output device 200 outputs a travel driving force (torque) for traveling of the vehicle to driving wheels. The travel driving force output device 200 includes, for example, a combination of an internal combustion engine, an electric motor, a transmission, and the like, and an electronic control unit (ECU) that controls these. The ECU controls the above configuration according to information input from the second controller 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to the information input from the second controller 160 or the information input from the driving operator 80 so that a brake torque according to a braking operation is output to each wheel. The brake device 210 may include a mechanism that transfers the hydraulic pressure generated by an operation of the brake pedal included in the driving operator 80 to the cylinder via a master cylinder, as a backup. The brake device 210 is not limited to the configuration described above and may be an electronically controlled hydraulic brake device that controls an actuator according to the information input from the second controller 160 and transfers the hydraulic pressure of the master cylinder to the cylinder.

The steering device 220 includes, for example, a steering ECU and an electric motor. The electric motor, for example, changes directions of steerable wheels by causing a force to act on a rack and pinion mechanism. The steering ECU drives the electric motor according to the information input from the second controller 160 or the information input from the driving operator 80 to change the directions of the steerable wheels.

[Functions of Recognizer, Determiner, and Action Plan Generator]

Figure 3:
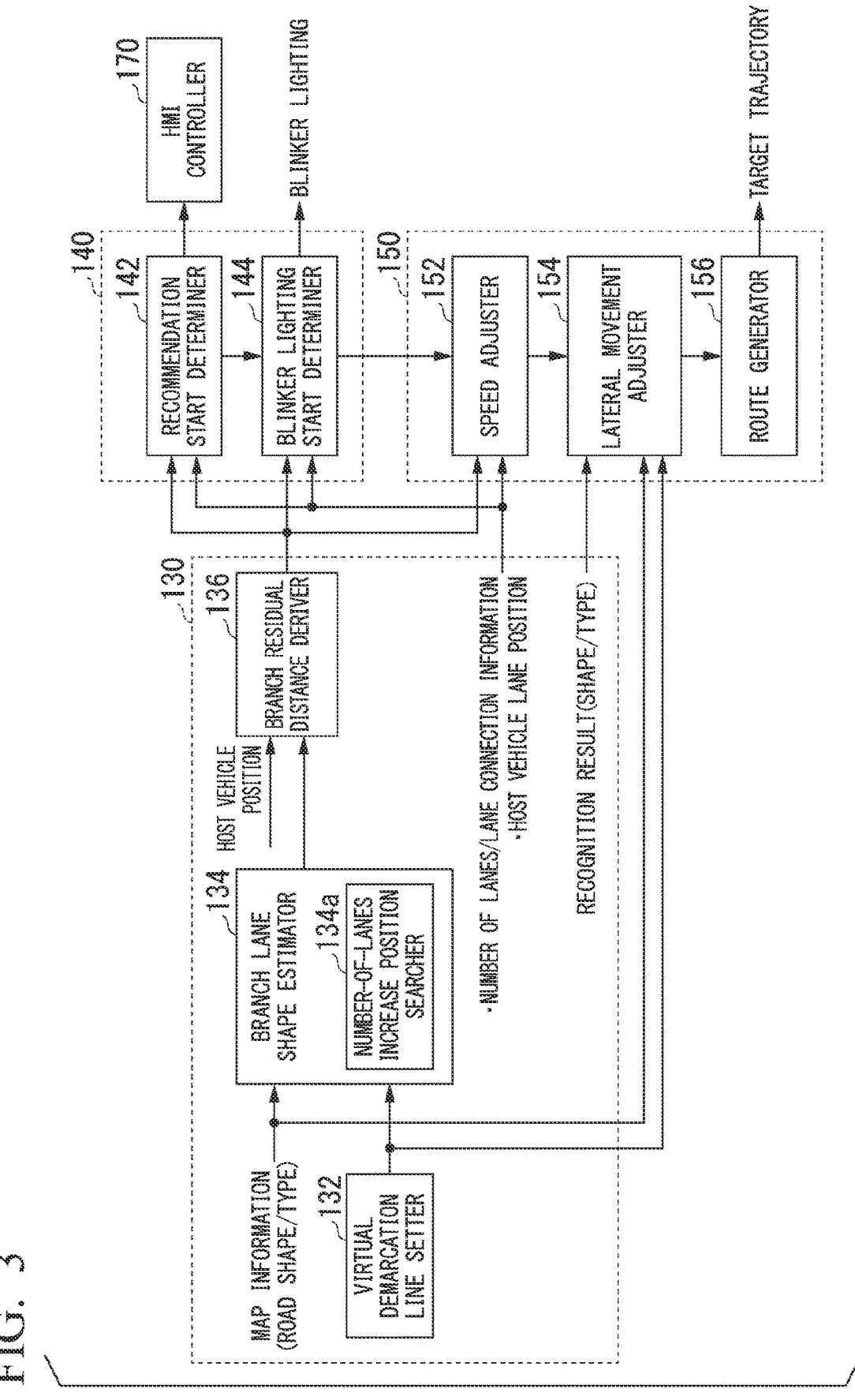
FIG. 3 is a diagram showing an example of functional configurations of a recognizer, a determiner, and an action plan generator.

Next, functions of the recognizer 130, the determiner 140, and the action plan generator 150 will be described in detail. FIG. 3 is a diagram showing an example of functional configurations of the recognizer 130, the determiner 140, and the action plan generator 150. The recognizer 130 includes, for example, a virtual demarcation line setter 132, a branch lane shape estimator 134, and a branch residual distance deriver 136.

The virtual demarcation line setter 132 determines whether or not there is a branch section within a predetermined distance in the traveling direction of the host vehicle M on the basis of the surroundings situation of the host vehicle M acquired from the map information on the basis of a recognition result of the surroundings situation of the host vehicle M according to the above-described sensor fusion processing and the position of the host vehicle M. When the virtual demarcation line setter 132 determines that there is the branch section within the predetermined distance in the traveling direction of the host vehicle M, the virtual demarcation line setter 132 further determines whether or not a demarcation line that demarcates the main lane side and the branch lane side in the branch section can be recognized on the basis of the recognition result, and sets a virtual demarcation line that demarcates the main lane and the branch lane when a demarcation line cannot be recognized.

Figure 4:
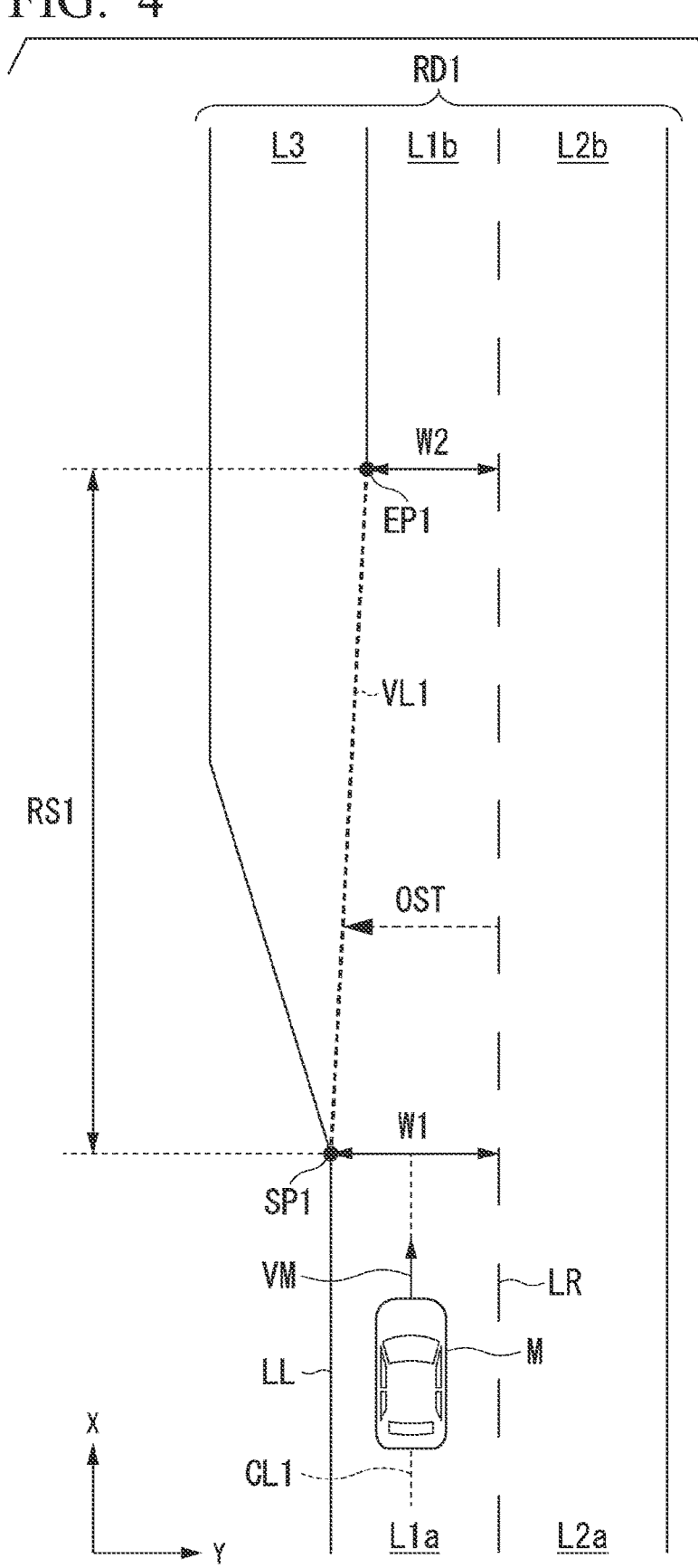
FIG. 4 is a diagram for describing a function of a virtual demarcation line setter.

FIG. 4 is a diagram for describing a function of the virtual demarcation line setter 132. The example of FIG. 4 shows a road RD1 including main lanes L1 (L1*a* and L1*b*) and L2 (L2*a* and L2*b*) and a branch lane L3. Both the lanes L1 and L2 are lanes in which a vehicle can travel in the same direction (a direction in which the lane extends or an X-axis direction in FIG. 4). The lane L1 is demarcated by a left demarcation line LL and a right demarcation line LR with respect to the traveling direction. In the example of FIG. 4, the host vehicle M is traveling on the lane L1 at a speed VM. Information on the demarcation lines LL and LR and the lanes L1 and L2 may be acquired by sensor fusion processing, or may be acquired by map information (the first map information 54 and the second map information 62).

The virtual demarcation line setter 132 refers to the map information to acquire a shape of the road RD1, the number of lanes, and position information of a start position (hereinafter referred to as a branch section start point) SP1 of a branch section RS1 in which the main lane (the lanes L1 and L2) and the branch lane L3 are connected, and an end position (hereinafter referred to as a branch section end point) EP1 of the branch section RS1, on the basis of position information of the host vehicle M detected by the vehicle sensor 40. The branch section start point SP1 is, for example, a point that is on the front side of the road when viewed in the traveling direction among connection points at which the branch lane L3 and the main lane (specifically, L1) are connected. The branch section end point EP1 is, for example, a point on the inner side of the road when viewed in the traveling direction among the connection points, and is a point corresponding to a start position of the branch lane L3.

The virtual demarcation line setter 132 determines whether the demarcation line (a branch side demarcation line) that demarcates the main lane side and the branch lane side can be recognized on the branch lane side (branch side) when viewed from the lane L1 in which the host vehicle M travels, in the branch section RS1 from the branch section start point SP1 to the branch section end point EP1 in a direction in which the main lane (the lanes L1 and L2) extends, on the basis of the recognition result of the recognizer 130. When a determination is made that the branch side demarcation line can be recognized, a target trajectory is generated so that the host vehicle M passes through a center CL1 of the lane L1 on the basis of the demarcation line (main lane side demarcation line) LR that demarcates the lanes L1 and L2 on the main lane side (lane L2), and the branch side demarcation line, and driving control is executed so that the host vehicle M travels along the generated target trajectory.

When the virtual demarcation line setter 132 determines that the branch side demarcation line cannot be recognized in the branch section RS1, the virtual demarcation line setter 132 sets a virtual demarcation line between the branch section start point SP1 and the branch section end point EP1. In this case, the virtual demarcation line setter 132 determines, for example, an offset amount (a distance from a main lane side demarcation line) OST based on the position of the main lane side demarcation line (specifically, the demarcation line LR) in the map information, and sets a virtual demarcation line on the basis of the determined offset amount OST.

For example, the virtual demarcation line setter 132 refers to the map information or the like to acquire a distance W1 to the demarcation line LR in a road width direction (a Y-axis direction in the figure) with reference to the branch section start point SP1 and a distance W2 to the demarcation line LR in the road width direction with reference to the branch section end point EP1. That is, the distance W1 is a width of the lane L1 at the branch section start point SP1, and the distance W2 is a width of the lane L1 at the branch section end point EP1. When the virtual demarcation line setter 132 sets a virtual demarcation line VL1 connecting the branch section start point SP1 to the branch section end point EP1, the virtual demarcation line setter 132 sets the virtual demarcation line VL1 so that a distance in the road width direction between the demarcation line LR and the virtual demarcation line VL1 (the offset amount OST from the demarcation line LR) changes (increases or decreases) by a predetermined change amount from the distance W1 to the distance W2.

This makes it possible to set a smooth virtual demarcation line while keeping an amount of change in a width of the traveling lane constant (monotonically increasing or monotonously decreasing the amount) even in the case of a road shape in which a width (that is, the distance W1) of the traveling lane L1*a* before branching and a width (that is, the distance W2) of the traveling lane L1*b* after branch are different, for example, as shown in FIG. 4. Therefore, it is possible to generate a target trajectory in which a centroid of the host vehicle M passes through a center between the virtual demarcation line VL1 and the demarcation line LR, for example, when generating a target trajectory traveling toward the lane L1*b* in the branch section RS1, and thus, it is possible for the host vehicle M to travel smoothly without laterally moving to the branch lane side even when there is the branch section RS1. When the host vehicle M performs lane change (course change) from the lane L1 to the branch lane L3, travel control is executed with reference to the virtual demarcation line VL1, and thus, more appropriate lane change control (speed control and steering control) is executed.

Figure 5:
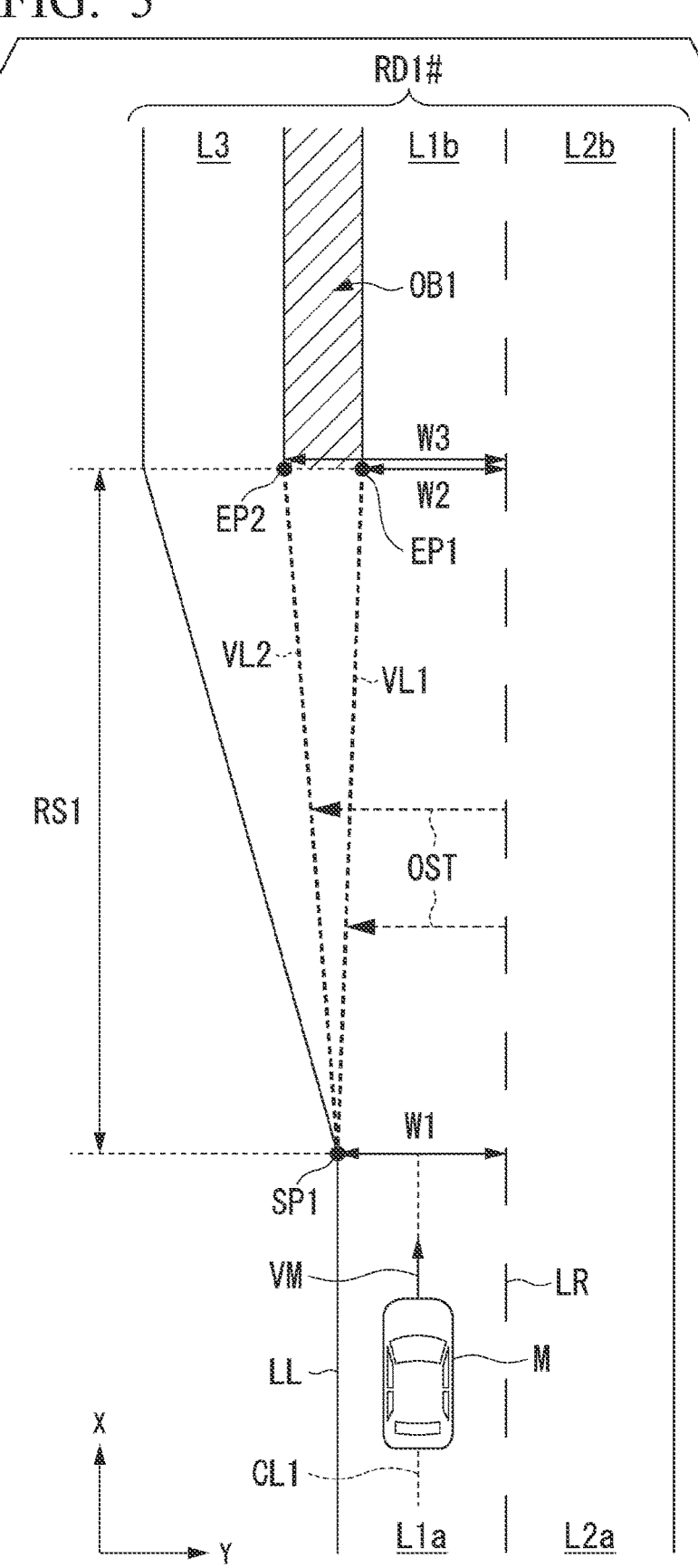
FIG. 5 is a diagram showing an example of setting a virtual demarcation line when there are a plurality of branch section end points.

The virtual demarcation line setter 132 may set a virtual demarcation line for each branch section end point when there are a plurality of branch section end points EP depending on a shape of a road. FIG. 5 is a diagram showing an example in which virtual demarcation lines are set when there are a plurality of branch section end points. A road RD1# shown in FIG. 5 differs from the road RD1 in FIG. 4 in that there are two branch section end points EP1 and EP2. As shown in FIG. 5, examples in which there are a plurality of branch section end points EP includes a case in which there is a road structure OB1 such as a separation zone, a guardrail, or a fence between a main lane (more specifically, the lane L1b) and the branch lane L3 and a case in which a width (a length in the Y-axis direction in the figure) of the hard nose or the soft nose is equal to or greater than a predetermined value when viewed from the traveling direction. In the example of FIG. 5, the two branch section end points EP1 and EP2 are present in the hard nose, and position information of the two branch section end points EP1 and EP2 is stored in the map information.

The virtual demarcation line setter 132 acquires the position information of the branch section start point SP1 and the branch section end points EP1 and EP2 from the map information, and also acquires the position information of the demarcation line LR on the main lane (the lane L2 in FIG. 5) side of the traveling lane L1 of the host vehicle M. The virtual demarcation line setter 132 sets a virtual demarcation line when one or both of a demarcation line connecting the branch section start point SP1 to the branch section end point EP1 and a demarcation line connecting the branch section start point SP1 to the branch section end point EP2 are not present.

For example, when there is no demarcation line connecting the branch section start point SP1 to the branch section end point EP1, the virtual demarcation line setter 132 acquires the distance W1 in the road width direction from the branch section start point SP1 to the demarcation line LR and the distance W2 in the road width direction from the branch section end point EP1 to the demarcation line LR as described above, and sets the virtual demarcation line VL1 connecting the branch section start point SP1 to the branch section end point EP1 when setting the virtual demarcation line VL1 so that the distance in the road width direction between the demarcation line LR and the virtual demarcation line VL1 (the offset amount OST from the demarcation line LR) changes by the predetermined change amount from the distance W1 to the distance W2. Further, similarly, when there is no demarcation line connecting the branch section start point SP1 to the branch section end point EP2, the virtual demarcation line setter 132 acquires the distance W1 and a distance W3 in the road width direction from the branch section end point EP2 to the demarcation line LR, and sets a virtual demarcation line VL2 connecting the branch section start point SP1 to the branch section end point EP2 so that a distance in the road width direction between the demarcation line LR and the virtual demarcation line VL2 (the offset amount OST from the demarcation line LR) changes by a predetermined change amount from the distance W1 to the distance W3 when setting the virtual demarcation line VL2. In the example of FIG. 5, the linear virtual demarcation lines VL1 and VL2 are set according to a predetermined amount of change. Even when there are three or more branch section end points, the virtual demarcation line setter 132 sets a virtual demarcation line for each branch section end point using the above-described scheme.

Accordingly, for example, when the host vehicle M continues to travel in the lane L1 in the branch section RS1, the target trajectory is set so that the host vehicle M travels at a center between the virtual demarcation line VL1 and the main lane side demarcation line LR. When the host vehicle M changes lanes from the lane L1 to the branch lane L3, the travel control of the host vehicle M is executed with reference to the virtual demarcation line VL1 until the lane change to the lane L3 is started, switching to the virtual demarcation line VL2 is performed at the time of the start of the steering control due to the lane change, and control of the lane change (speed control and steering control) of the host vehicle M is executed.

The action plan generator 150 (a lateral movement adjuster 154 which will be described later) may switch the virtual demarcation line serving as a reference for steering control at the time of course change to adjust the target trajectory so that an amount of movement (for example, an amount of lateral movement) of the host vehicle M between before and after switching between the virtual demarcation lines VL1 and VL2 is smaller than a predetermined amount to prevent a trajectory of the host vehicle M from greatly changing (to make an amount of change in steering smaller than a threshold). This makes it possible to cause the host vehicle M to smoothly travel and to reduce discomfort felt by occupants during travel even when switching between the virtual demarcation lines serving as travel control targets has been performed.

The virtual demarcation line setter 132 sets both the virtual demarcation lines VL1 and VL2 in advance, even when the host vehicle M continues to travel in the lane L1 and changes lanes from the lane L1 to the lane L3. This makes it possible to suppress a loss of time due to the setting of the demarcation line at a point in time when the host vehicle M suddenly performs the course change to the branch lane L3 according to an operation (for example, a blinker operation) of the occupant of the host vehicle M during traveling in the branch section RS1, for example, in a case in which the host vehicle M suddenly performs course change, and to suppress a large behavior of the host vehicle M due to a loss of time.

As described above, when there are a plurality of branch section end points, the virtual demarcation line setter 132 sets a virtual demarcation line corresponding to each branch section end point, making it possible to set a more accurate virtual demarcation line according to road conditions as compared to a case in which a single virtual demarcation line is set on the basis of a way point of the plurality of branch section end points. Therefore, when the vehicle travels on the basis of the virtual demarcation line, it is possible to execute driving control in which discomfort given to occupants of the host vehicle M is reduced.

When the virtual demarcation line is set by the virtual demarcation line setter 132, the HMI controller 170 may cause information on the virtual demarcation line to be output to the display 32 of the HMI 30, or the like. This makes it possible for the occupant to easily ascertain that control of lane change or the like is being executed on the basis of the virtual demarcation line in automated driving or the like, and to further reduce anxiety based on change in a behavior of the host vehicle M.

Referring back to FIG. 3, the branch lane shape estimator 134 acquires the virtual demarcation line set by the virtual demarcation line setter 132, the road shape (a shape of the branch section and the branch lane) acquired from the map information, the number of branch lanes, a type of branch, and a type of demarcation line. Examples of the type of branch include "single-opening branching", "double-opening branching", "three-branch branching", "outward branching (branching to an outer side of a curve)", and "inward branching (branching to an inner side of a curve)". The branch lane shape estimator 134 estimates a position of a center of each lane of the branch lane.

The branch lane shape estimator 134 includes, for example, a number-of-lanes increase position searcher 134a. The number-of-lanes increase position searcher 134a, for example, acquires a position of the branch section from map information or the like, and searches for a position at which the number-of-lanes increase starts on the branch side (number-of-lanes increase start position) in the acquired branch section. A function of the branch lane shape estimator 134 will be described in detail later.

The branch residual distance deriver 136 derives one or both of a residual distance from a current position (a host vehicle position) of the host vehicle M to the branch section start point and a residual distance to the branch end position according to a detection result of the vehicle sensor 40. The branch residual distance deriver 136 may derive a residual distance from the host vehicle position to the number-of-lanes increase start position.

The determiner 140 determines whether or not course change (lane change) in the branch section is to be started on the basis of the recognition result of the recognizer 130 (for example, the branch residual distance derived by the branch residual distance deriver 136, the number of lanes, the lane connection information, and a host vehicle lane position). The determiner 140 includes, for example, a recommendation start determiner 142 and a blinker lighting start determiner 144.

For example, when at least part of the driving control of the host vehicle M is executed by manual driving, the recommendation start determiner 142 determines whether or not recommendation for prompting the occupant of the host vehicle M to perform lane change or the like is to be started, on the basis of the position of the host vehicle M, the map information, the destination, and the recognition result of the recognizer 130. For example, the recommendation start determiner 142 determines that recommendation for prompting the occupant to perform lane change is to be started when a distance from the position of the host vehicle M to the branch section start point or the number-of-lanes increase start position is within a predetermined distance and a destination direction (traveling direction) of the host vehicle M is a lane (for example, a branch side lane) different from a current traveling lane (for example, the main lane). The recommendation start determiner 142 determines that the recommendation is not started when the destination direction is the traveling lane (when there is no need to perform lane change) even when a distance of the host vehicle M from the branch section is smaller than a predetermined distance.

When the recommendation start determiner 142 determines that the lane change recommendation is to be started, the recommendation start determiner 142 outputs, to the HMI controller 170, control information for causing a notification for prompting the occupant of the host vehicle M to perform lane change to be output to the HMI 30. The HMI controller 170, for example, generates an image for prompting lane change in the branch section, and outputs the generated image to the display 32 of the HMI 30. The HMI 30 may generate sound instead of (or in addition to) the image, and cause the generated sound to be output from the speaker 34.

The blinker lighting start determiner 144 determines whether or not lighting of blinkers mounted on the host vehicle M has been started. For example, when the blinker lighting start determiner 144 receives an operation with respect to the blinker switch 36 by the occupant, the blinker lighting start determiner 144 determines that blinkering of the blinker in a direction (a right direction or left direction)

of the lane change operated by the blinker switch 36 has been started. Further, when the blinker lighting start determiner 144 determines that lighting of the blinker has been started after the recommendation start determiner 142 has determined that the recommendation is to be started, the blinker lighting start determiner 144 outputs information indicating that an intention of the occupant for execution of driving control (for example, ALC) according to the recommendation has been received, to the action plan generator 150.

The action plan generator 150 generates a target trajectory for future travel with reference to the current position of the host vehicle M on the basis of the recognition result of the recognizer 130 (for example, the branch residual distance derived by the branch residual distance deriver 136, the number of lanes, the lane connection information, the host vehicle lane, and a demarcation line shape) or the like. The action plan generator 150 includes, for example, a speed adjuster 152, a lateral movement adjuster 154, and a route generator 156.

The speed adjuster 152 adjusts the speed of the host vehicle M when the host vehicle M performs course change to the branch lane, on the basis of the branch residual distance derived by the branch residual distance deriver 136, the position (traveling lane) of the host vehicle M, the number of lanes, or the lane connection information, for example. The speed adjuster 152 may adjust a speed when the host vehicle M continues to travel in the main lane in the branch section, and may perform speed adjustment not in the branch section or others according to the surroundings situation (the road shape or surrounding vehicles).

The lateral movement adjuster 154 adjusts a lateral position (a position in the road width direction) of the host vehicle M with respect to the road on the basis of the virtual demarcation line set by the virtual demarcation line setter 132, demarcation line information (shape or type) acquired from the map information, demarcation line information obtained from a result of recognizing the image captured by the camera 10, and the like. The lateral movement adjuster 154 may perform, for example, adjustment such as steering control required by the host vehicle M at a target lateral position at a certain point, on the basis of speed information of the host vehicle M adjusted by the speed adjuster 152. The lateral movement adjuster 154 may adjust, for example, a position at which the steering control starts or a position at which the steering control ends, an amount of movement of the lateral position in a predetermined period of time, and the like. When the recognizer 130 recognizes that an object (for example, another vehicle) is present around the host vehicle M, the speed adjuster 152 and the lateral movement adjuster 154 described above perform adjustment of speed control or lateral movement control so that the host vehicle M does not come into contact with the recognized object.

The route generator 156, for example, generates a target trajectory (travel route) for lane change from the main lane to the branch lane in the branch section on the basis of the current position of the host vehicle M, an adjustment result of the speed adjuster 152 or the lateral movement adjuster 154, and the like, or generates a target trajectory for continuous travel in the main lane. The route generator 156, for example, repeatedly generates the target trajectory at a predetermined cycle. A route generated by the route generator 156 is output to the second controller 160, and speed control or steering control is executed so that the host vehicle M travels along the generated target trajectory.

[Branch Lane Shape Estimator and Lane Change in Branch Section]

Figure 6:
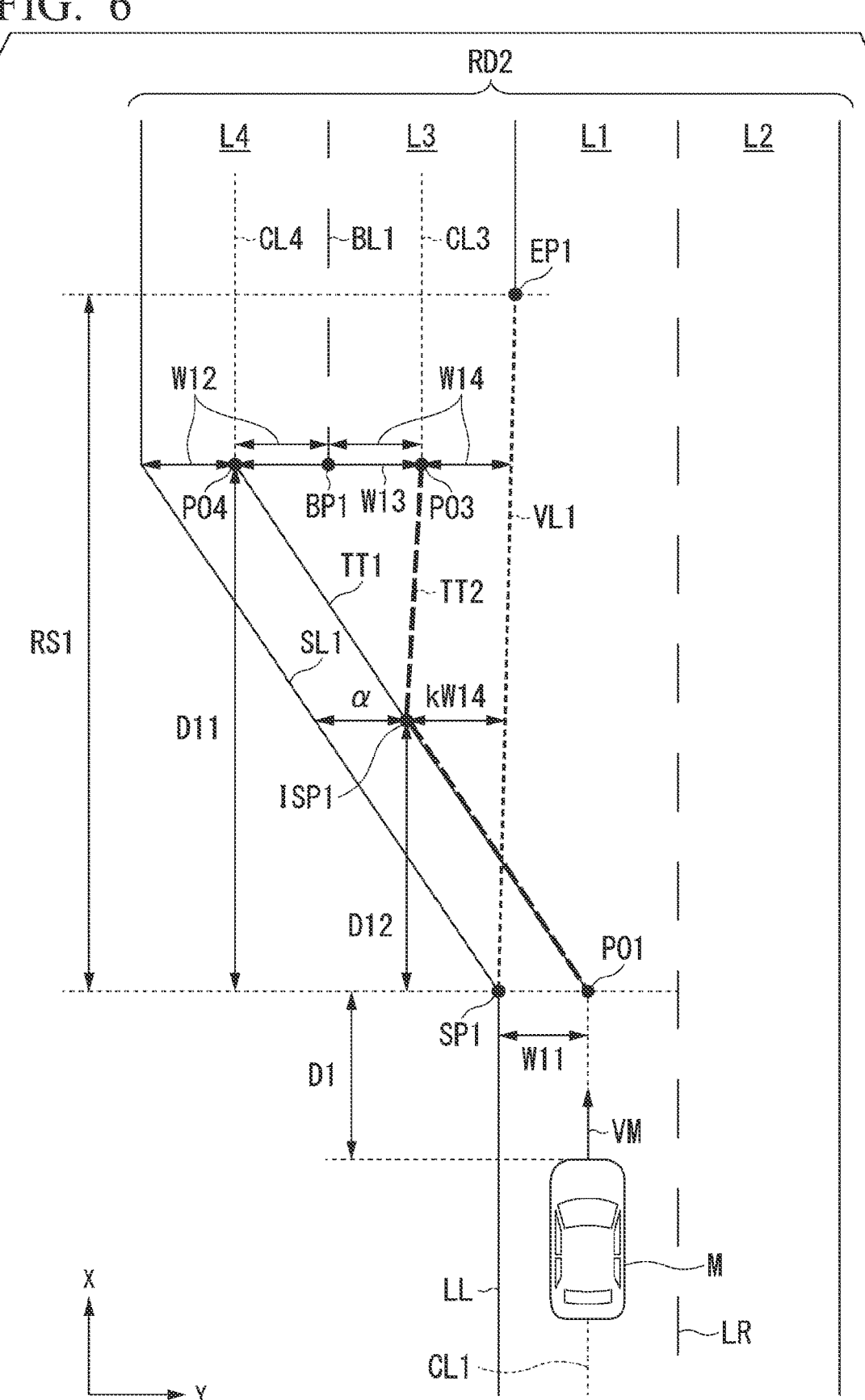
FIG. 6 is a diagram for describing generation of a target trajectory when lane change is performed in a branch section.

Next, the function of the branch lane shape estimator 134 in the first embodiment and the lane change in the branch section based on an estimation result will be specifically described. FIG. 6 is a diagram for describing generation of the target trajectory when the lane change is performed in the branch section. The example of FIG. 6 shows a road RD2 having two lanes (L1 and L2) that can travel in the same direction, and two branch lanes L3 and L4. In the example of FIG. 6, it is assumed that the centroid of the host vehicle M is on the center CL1 of the lane L1, and the host vehicle M is traveling at a point that is at a distance D1 before the branch section (the branch section start point SP1) at the speed VM. In the example of FIG. 6, it is assumed that the destination direction of the host vehicle M is on the side of the branch lanes L3 and L4. In FIG. 6, a length of half the width of the lane L1 (in other words, a lateral distance from the demarcation line LL or LR to the center CL1) is W11, half the width of the branch lane L4 (a lateral distance from a demarcation line of the lane L4 to a center CL4 of the lane L4) is W12, a length of half the width of the branch lane L3 (a lateral distance from a demarcation line of the lane L3 to a center CL3 of the lane L3) is W14, and a length that is a sum of the lengths W12 and W14 is a length W13. In the example of FIG. 6, the distance D1 is the residual distance from the current position of the host vehicle M to the branch section start point SP1 derived by the branch residual distance deriver 136.

In a scene of FIG. 6, the virtual demarcation line setter 132 determines whether or not the demarcation line that demarcates the main lane side (the lane L1) and the branch lane side is recognized, on the basis of the recognition result of the recognizer 130 or the map information, in the branch section RS1 from the branch section start point SP1 to the branch section end point EP1, and sets the virtual demarcation line VL1 connecting the branch section start point SP1 to the branch section end point EP1 as described above when the demarcation line is not recognized. When the demarcation line that demarcates the main lane side and the branch lane side is recognized, subsequent processing is performed using the recognized demarcation line without setting the virtual demarcation line. In the following description, it is assumed that the virtual demarcation lines are set by the virtual demarcation line setter 132.

Here, in the branch section RS1, when there are no demarcation lines of the lanes L3 and L4, a lane width between the demarcation line LR and a demarcation line SL1 gradually increases, and thus, the host vehicle M tries to travel at a center thereof and performs unnecessary steering control or the host vehicle M travels while interfering with the virtual demarcation line VL1 (in other words, travels on the virtual demarcation line VL1), which may not be appropriate driving control, for example, to give discomfort to the occupants. Therefore, when the host vehicle M changes lanes from the lane L1 to the lane L3 or L4, the action plan generator 150 generates a target trajectory so that a degree of interference with the virtual demarcation line VL1 is reduced, on the basis of, for example, the branch lane shape estimated by the branch lane shape estimator 134. Reducing the degree of interference between the virtual demarcation line VL1 and the target trajectory means, for example, preventing the host vehicle M traveling along the target trajectory from traveling on the virtual demarcation line VL1, in other words, setting a distance between the virtual demarcation line VL1 and the target trajectory to a predetermined distance or more. "Reducing the degree of interference with the virtual demarcation line VL1" may be rephrased as "suppressing the interference with the virtual demarcation line VL1."

The branch lane shape estimator 134 estimates a shape of a demarcation line on the outermost side (an outermost demarcation line) SL1 of the branch lanes L3 and L4 on the basis of the recognition result of the recognizer 130 or the map information. The branch lane shape estimator 134 may estimate a shifted demarcation line (outermost demarcation line) SL1 so that an amount of offset from the virtual demarcation line VL1 becomes a predetermined amount of change (for example, increases to a predetermined amount) with respect to a movement in the X-axis direction from the branch section start point SP1 to a branch edge position BP1 (a movement by the distance D11 in the figure) on the basis of the virtual demarcation line VL1 set by the virtual demarcation line setter 132.

The branch lane shape estimator 134 determines an edge position (branch edge position) of each of the branch lanes L3 and L4. The branch edge position is, for example, a position at which widths of all branch lanes can be determined. For example, in FIG. 6, an edge BP1 of a demarcation line BL1 that demarcates the lane L3 and the lane L4 is present at a position before the branch section end point EP1 when viewed from the host vehicle M, and the widths of the lanes L3 and L4 can be recognized from the edge BP1, the demarcation line on the outermost side (outermost demarcation line) SL1 of the branch lane, and the virtual demarcation line VL1. Therefore, the branch lane shape estimator 134 determines a position of the edge BP1 as the branch edge position.

The number-of-lanes increase position searcher 134a of the branch lane shape estimator 134 searches for a number-of-lanes increase start position ISP1 in the branch section RS1. In this case, the number-of-lanes increase start position ISP1 is searched for on the basis of a predetermined parameter k and a shape of the outermost demarcation line SL1 of the branch side lane. For example, the branch lane shape estimator 134 searches for a position at which a distance in the lateral direction (Y-axis direction) from the virtual demarcation line VL1 becomes equal to or greater than a reference value (a predetermined value) kW14 obtained by multiplying the predetermined parameter k by the value W14 that is half the width of the lane L3, and determines the position to be the number-of-lanes increase start position ISP1. The parameter k may be a fixed value or may be variably set on the basis of the number of lanes (or the number of branch lanes) of the road RD2, a curvature of the road or lane, a distance of the branch section RS1, and the like.

The parameter k may be set so that the reference value kW14 is greater than a length obtained by adding a predetermined amount (margin amount) to half the vehicle width of the host vehicle M. Therefore, in the first embodiment, a number-of-lanes increase start position ISP1 becomes a position at which a distance of the lateral position from the virtual demarcation line VL1 is equal to or larger than half the vehicle width of the host vehicle M. Thus, the number-of-lanes increase start position ISP1 is set, making it possible to set the number-of-lanes increase start position ISP1 at an appropriate position at which the host vehicle M does not interfere with the virtual demarcation line VL1.

The branch lane shape estimator 134 derives the distance D12 in the X-axis direction from the branch section start point SP1 to the number-of-lanes increase start position ISP1. Since the distance D12 is a distance required for the host vehicle M to laterally move from the current position to the number-of-lanes increase start position ISP1, the distance D12 may be adjusted to a predetermined length or more so that a steering amount of the host vehicle M does not become equal to or larger than a predetermined amount (so that the amount of lateral movement in a predetermined distance does not become equal to or larger than a predetermined amount). Thereby, coordinates of the number-of-lanes increase start position ISP1 on the road RD2 are specified. The branch lane shape estimator 134 is not limited to a case in which the branch lane includes two lanes, but may determine the number-of-lanes increase start position ISP1 even when the branch lane includes one lane or three or more lanes.

When the route generator 156 generates a target trajectory for causing the host vehicle M to travel from the current traveling lane L1 to the lane L3 or L4 in the branch section RS1, the route generator 156 generates a target trajectory that passes through the number-of-lanes increase start position ISP1 estimated by the branch lane shape estimator 134. For example, when the host vehicle M is caused to travel from the lane L1 to the branch lane L4, the route generator 156 generates a target trajectory TT1 in which the centroid of the host vehicle M passes through the number-of-lanes increase start position ISP1, and which connects a position PO1 of the center CL1 of the lane L1 at the branch start point SP1 to an edge position PO4 of the center CL4 of the lane L4. In this case, the route generator 156 forms a target trajectory TT1 so that the target trajectory TT1 passes through a position laterally (the Y-axis direction shown in FIG. 6) offset by a predetermined distance a from the outermost demarcation line SL1 of the branch section RS1. α is a value that is set so that a degree of interference between the host vehicle M and the outermost demarcation line SL1 is reduced, and is the reference value kW14, for example.

When the host vehicle M is caused to travel from the lane L1 to the branch lane L3, the route generator 156 generates a target trajectory TT2 in which the centroid of the host vehicle M passes through the number-of-lanes increase start position ISP1, and which connects the position PO1 to an edge position PO3 of the center CL3 of the lane L3. Although the target trajectories TT1 and TT2 are shown as linear trajectories in the example of FIG. 6, a target trajectory that is at least partially non-linear (curved) may be generated such that a steering amount (the amount of change in a lateral position of the host vehicle M) is equal to or smaller than the threshold. This makes it possible to generate the target trajectory so that a degree of interference with the demarcation line (the virtual demarcation line VL1 in the example of FIG. 6) that demarcates the branch lane side and the main lane side is reduced when the host vehicle M moves to the branch lane side.

The route generator 156 may generate a target trajectory from the position PO1 to the number-of-lanes increase start position ISP1 as a common target trajectory regardless of which lane the vehicle travels in among the plurality of branch lanes, and generate a residual target trajectory according to the branch lane in which the host vehicle M travels after reaching the number-of-lanes increase start position ISP1. In this case, the number-of-lanes increase start position ISP1 becomes a branch point of the target trajectory directed to the branch lane. Thus, the number-of-lanes increase start position ISP1 is determined, making it possible to suppress interference between the host vehicle M and the demarcation line to reduce discomfort felt by the occupants, to generate a more appropriate target trajectory, and to execute driving control along the target trajectory even when the number of a plurality of lanes has increased due to a branch.

The recommendation start determiner 142 may perform a notification for prompting the occupant of the host vehicle M to perform lane change at a predetermined timing when the host vehicle M is traveling in the lane L1 and a course to the destination direction is the branch lanes L3 and L4. The predetermined timing is, for example, a timing when the distance D1 from the position of the host vehicle M to the number-of-lanes increase start position ISP1 becomes smaller than a threshold. The recommendation start determiner 142 outputs the control information for causing the HMI 30 to perform a predetermined notification to the HMI controller 170 when performing the notification for prompting the occupant to perform lane change. The HMI controller 170 causes a notification for prompting lane change to the branch lane (the lane L3 or the lane L4) to be output to the HMI 30 on the basis of the control information. Thereafter, when an instruction to change lanes in a branch lane direction is received by an operation with respect to the blinker switch 36 or the like from the occupant, the blinker lighting start determiner 144 starts lighting of the blinkers of the host vehicle M on the branch lane direction side (left side in the figure).

The speed adjuster 152 performs speed adjustment for performing lane change on the basis of the shape of the branch section, the shape of the branch lane, the number-of-lanes increase start position, and the like. The lateral movement adjuster 154 adjusts the steering amount of the host vehicle M on the basis of the virtual demarcation line VL1, the demarcation line LR on the main lane side, the number-of-lanes increase start position, and a distance from the position of the host vehicle M to the number-of-lanes increase start position or the branch section end point. Accordingly, the driving controller executes driving control of the host vehicle M so that the host vehicle M travels along the target trajectory TT1 or TT2. Which of the target trajectories TT1 and TT2 the host vehicle M travels along may be set on the basis of, for example, destination information set by the navigation device 50 and the position of the host vehicle M, may be set on the basis of an instruction (a blinker operation) by the occupant, or may be set on the basis of a congestion situation of each of the lanes L3 and L4, the speed of the host vehicle M, and the like.

[Processing Flow (First Embodiment)]

Next, a flow of processing executed by the automated driving control device 100 of the first embodiment will be described. Hereinafter, driving control processing including processing of generating the target trajectory mainly on the basis of the setting of the virtual demarcation line and an estimation result of the branch lane shape among the processing executed by the automated driving control device 100 will be mainly described. The processing of this flowchart may be repeatedly executed at predetermined timings, for example.

Figure 7:
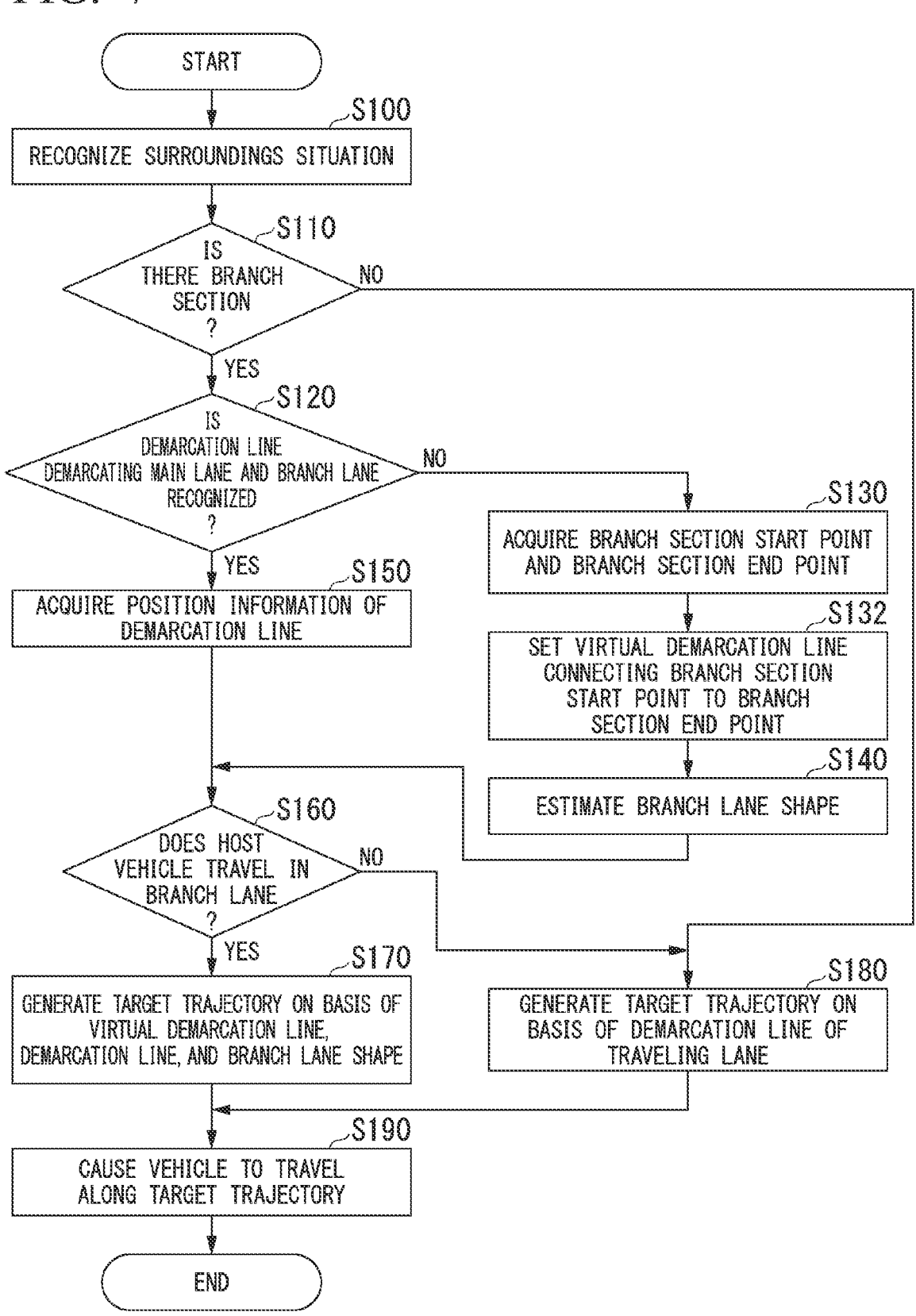
FIG. 7 is a flowchart showing an example of a flow of driving control processing executed by the automated driving control device of the first embodiment.

FIG. 7 is a flowchart showing an example of a flow of driving control processing executed by the automated driving control device 100 of the first embodiment. The processing shown in FIG. 7 is also processing that is executed in second and third embodiments, which will be described later. In the example of FIG. 7, it is assumed that the host vehicle M is traveling on the main lane through automated driving. In the example of FIG. 7, the recognizer 130 recognizes the surroundings situation of the host vehicle M (step S100), and determines whether or not there is the branch section within the predetermined distance in the traveling direction of the host vehicle M (step S110). When a determination is made that there is a branch section, the virtual demarcation line setter 132 determines whether or not a demarcation line demarcating the main lane and the branch lane is recognized (step S120). When a determination is made that the demarcation line is not recognized, the virtual demarcation line setter 132 acquires a start point and an end point of the branch section (step S130), and sets a virtual demarcation line connecting the acquired start and end points (step S132). Next, the branch lane shape estimator 134 estimates the number, a shape, or the like of the branch lanes on the basis of the recognition result of the recognizer 130 or the map information (step S140). In the processing of step S120, when a determination is made that the demarcation line that demarcates the main lane and the branch lane has been recognized, the position information of the demarcation line is acquired (step S150).

After the processing of step S140 or step S150, the automated driving control device 100 determines, for example, whether or not the host vehicle M travels in the branch lane present ahead of the branch section on the basis of the destination information set by the navigation device 50 and the position of the host vehicle M (step S160). In the processing of step S160, a determination may be made as to whether or not the host vehicle M travels in the branch lane depending on whether or not a lane change intention of the occupant has been received by an operation with respect to the blinker switch 36, the HMI 30, or the like by the occupant, instead of the destination information set by the navigation device 50.

When a determination is made that the host vehicle M travels in the branch lane, the branch lane shape estimator 134, for example, generates a target trajectory on the basis of the virtual demarcation line set by the processing of step S132, the branch lane shape estimated by the processing of step S140, or the demarcation line acquired by the processing of S150 (step S170). When a determination is made in the processing of step S110 that there is no branch section, or when a determination is made in the processing of step S160 that the host vehicle M does not travel in the branch lane, the target trajectory is generated, for example, on the basis of the demarcation line of the current traveling lane (step S180). After the processing of step S170 or step S180, the second controller 160 causes the host vehicle M to travel along the generated target trajectory (step S190). Thus, the processing of this flowchart ends.

[Step S140: Estimation of Branch Lane Shape]

Next, branch lane shape estimation processing shown in steps S140 in the processing shown in FIG. 7 will be specifically described. FIG. 8 is a flowchart showing an example of a branch lane shape estimation process according to the first embodiment. In the example of FIG. 8, the branch lane shape estimator 134 determines a shape or type of the branch section obtained from the recognition result of the recognizer 130 or the map information, and a start position (branch edge position) of each of one or more branch lanes present ahead of the branch section (step S141A). Next, the branch lane shape estimator 134 estimates a shape of a demarcation line of a outermost branch lane (an outermost demarcation line shape) among the branch lanes (step S141B).

Next, the branch lane shape estimator 134 searches for the number-of-lanes increase start position in the branch section (step S141C). Next, the branch lane shape estimator 134 sets the center line of the traveling lane of the host vehicle M on the basis of the recognition result of the recognizer 130 or the map information (step S141D). Accordingly, the flowchart ends. The action plan generator 150 regards the center of the lane as an ideal travel route at which the target trajectory aims, and generates a target trajectory that passes through the number-of-lanes increase start position from the current position of the host vehicle M and travels in the branch lane in which the host vehicle M travels, on the basis of the above-described outermost demarcation line, the demarcation line (the virtual demarcation line) that demarcates the main lane and the branch lane, information on the center line of the traveling lane, and the like.

According to the first embodiment described above, it is possible to set a more appropriate virtual demarcation line even when the demarcation line that demarcates the main lane side and the branch lane side in the branch section cannot be recognized, and it is possible to perform driving control in which discomfort given to the occupants is reduced even when the host vehicle M travels in the main lane and even when course change (lane change) to the branch lane side is performed. According to the first embodiment, when there are a plurality of branch section end points, a virtual demarcation line corresponding to each end point is set, making it possible to cause the host vehicle M to travel along a more appropriate target trajectory even when the host vehicle M travels in the main lane or even when the host vehicle M performs course change to the branch lane. According to the first embodiment, it is possible to generate the target trajectory (traveling route) of the host vehicle M so that the degree of interference with the demarcation line is reduced. Therefore, it is possible to perform more appropriate driving control on the host vehicle M.

Second Embodiment

Next, a second embodiment of the vehicle control device will be described. The second embodiment differs from the first embodiment in the method of searching for the number-of-lanes increase start position in the branch section. Specifically, the second embodiment differs from the first embodiment in that, in the first embodiment, the number-of-lanes increase start position is searched for on the basis of the vehicle width of the host vehicle M and the width of the branch lane from the side of the branch section start point SP1 (the host vehicle M) toward the branch lane, whereas in the second embodiment, the number-of-lanes increase start position is searched for on the basis of a width of the branch section from the branch lane side toward the branch section start point SP1 side. Therefore, the following description will focus mainly on the differences, and other descriptions will be omitted. Since a configuration of the vehicle system 1 similar to that of the first embodiment can be applied to the second embodiment, the configuration of the vehicle system 1 described above will be used in the following description.

Figure 9:
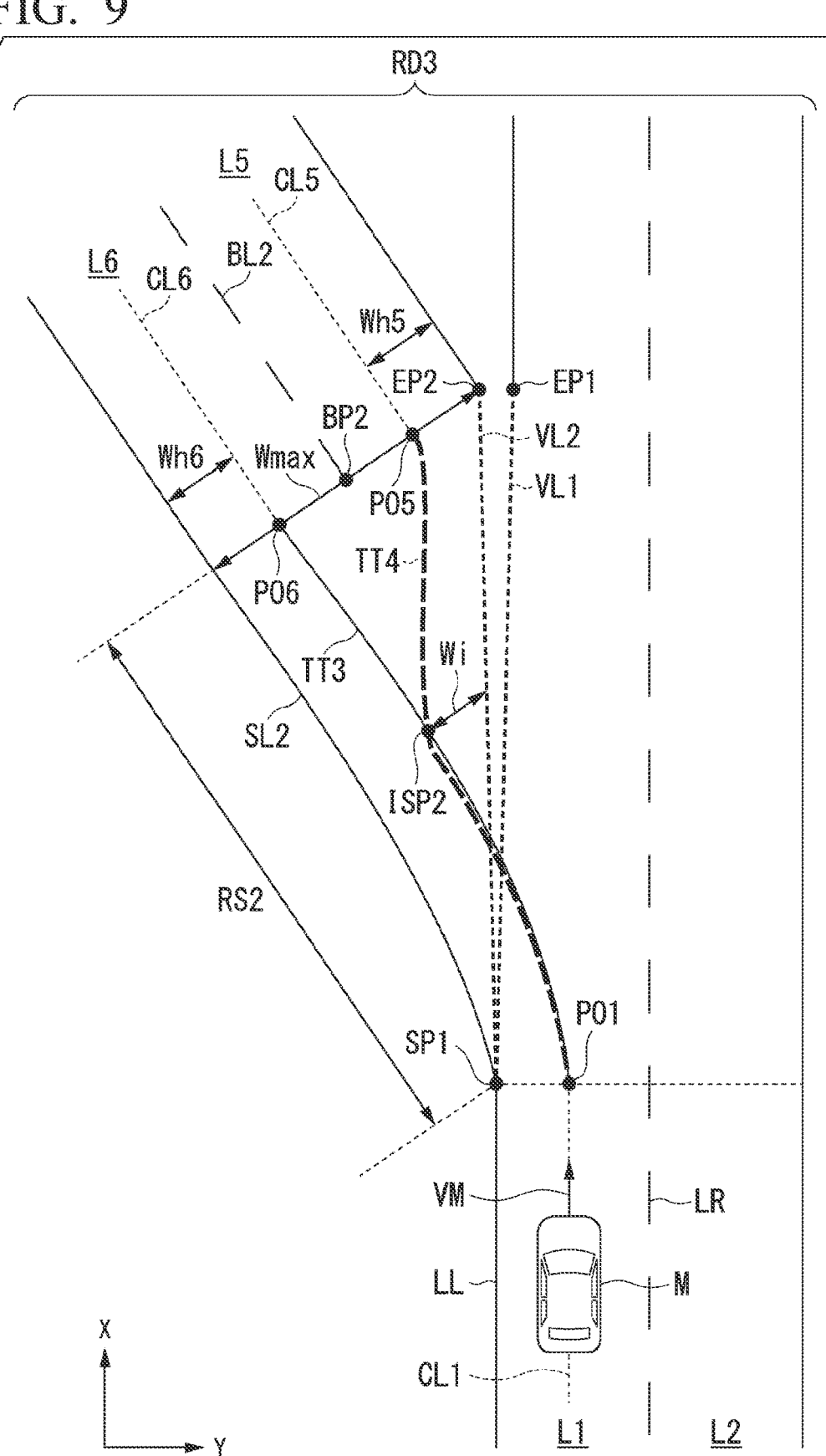
FIG. 9 is a diagram for describing a method of searching for a number-of-lanes increase start position of a branch lane in a second embodiment.

FIG. 9 is a diagram for describing a method of searching for a number-of-lanes increase start position ISP2 of the branch lane in the second embodiment. The example of FIG. 9 shows a road RD3 having main lanes L1 and L2 and two branch lanes L5 and L6. In the example of FIG. 9, it is assumed that there are one branch section start point SP1 and two branch section end points EP1 and EP2, and the virtual demarcation line VL1 linearly connecting the branch section start point SP1 to the branch section end point EP1 and the virtual demarcation line VL2 linearly connecting the branch section start point SP1 to the branch section end point EP2 are set by the virtual demarcation line setter 132. In the example of FIG. 9, it is assumed that, in the branch section RS2, a width of the road from the branch section start point SP1 gradually increases (becomes longer or larger) toward the branch lane side. In the example of FIG. 9, it is assumed that the host vehicle M is traveling in the lane L1 at the speed VM toward the branch section RS2.

For example, when there is no demarcation line that demarcates the branch lanes L5 and L6 in the branch section RS2 shown in FIG. 9, and when the target trajectories (the centers of the branch lanes L5 and L6) interfere unnecessarily (the target trajectories are close to each other within a predetermined distance) even in a case in which the host vehicle M is caused to travel in any one of a plurality of branch lanes L5 and L6 running in parallel, the occupant or a surrounding vehicle cannot specify which branch lane the host vehicle M is directed to, the occupant is made anxious, and smooth traveling cannot be performed in some cases. Therefore, in the second embodiment, when the number-of-lanes increase start position is searched for, the number-of-lanes increase start position at which a degree of interference between the target trajectories (between centers of the branch lanes) becomes small, in addition to interference between the target trajectory and the demarcation line being reduced, is searched for.

In the second embodiment, the number-of-lanes increase position searcher 134*a* searches for a position satisfying a predetermined condition from a position with a maximum width Wmax of the road in the branch section RS2 toward the branch section start point (or a host vehicle M side direction). The maximum width Wmax of the road indicates, for example, that widths of the demarcation line (the virtual demarcation line VL2 in the example of FIG. 9) on the branch lane side among the demarcation lines (the virtual demarcation lines VL1 and VL2 in the example of FIG. 9) that demarcate the main lane side and the branch lane side, and the outermost demarcation line SL2 are maximized. In the example of FIG. 9, a straight line connecting the branch section end point EP2 to the outermost demarcation line SL2 through a branch edge position BP2 of a demarcation line BL2 demarcating the lanes L5 and L6 is the maximum width Wmax of the road. Therefore, the number-of-lanes increase position searcher 134*a* searches for the position satisfying the predetermined condition from this position toward the branch section start point SP1, and determines the position satisfying the predetermined condition to be the number-of-lanes increase start position ISP2.

Here, the predetermined condition is, for example, a position at which a width Wi between a target trajectory TT3 connecting an edge position PO6 of a center CL6 of the outermost lane (the lane L6 shown in FIG. 9) among the plurality of branch lanes (the lanes L5 and L6 shown in FIG. 9) to the position PO1 and the virtual demarcation line VL2 is equal to or smaller than a predetermined value. The target trajectory TT3 is, for example, a trajectory that is generated along a position (including a predetermined margin (acceptable range)) at which a lateral distance from the outermost demarcation line SL2 becomes a length Wh6 that is half the width of the lane L6 on the basis of a shape of the outermost demarcation line SL2 (a shape of the branch section RS), and is generated by the route generator 156. The predetermined value is, for example, a length Wh5 that is half the width of the lane L5 that is closest to the main lane among the plurality of branch lanes (the lanes L5 and L6) (the lane L5 that is not a target branch lane for which the target trajectory TT3 has been generated among the plurality of branch lanes). The number-of-lanes increase start position ISP2 is determined under the above-described condition, making it possible for the host vehicle M to travel to the branch edge position (the start position of the branch lane) while reducing the degree of interference with the virtual demarcation line VL2 or the outermost demarcation line SL2 and reducing the degree of interference between the target trajectories up to the respective branch lane after passing through the number-of-lanes increase start position ISP2.

After the number-of-lanes increase position searcher 134*a* determines the number-of-lanes increase start position ISP2, the route generator 156 generates a target trajectory TT4 for causing the host vehicle M to travel in the lane L5 from the lane L1 in the branch section RS2. In this case, the route generator 156 generates the target trajectory TT4 in which the centroid of the host vehicle M passes through the position PO1 and the number-of-lanes increase start position ISP2 and then passes through a start position PO5 of a center line CL5 of the lane L5.

The route generator 156 may generate the target trajectory from the position PO1 to the number-of-lanes increase start position ISP2 as a common target trajectory regardless of which lane the vehicle travels to among the plurality of branch lanes, and generate a remaining target trajectory according to the branch lane in which the host vehicle M travels after reaching the number-of-lanes increase start position ISP2. In this case, the number-of-lanes increase start position ISP2 becomes a branch point of the target trajectory directed to the branch lane.

The driving controller executes driving control of the host vehicle M so that the host vehicle M travels along the target trajectory TT3 or TT4. Which one of the target trajectories TT3 and TT4 the host vehicle M travels along may be set, for example, on the basis of the destination information set by the navigation device 50 and the position of the host vehicle M, may be set on the basis of an instruction (a blinker operation) by the occupant, or may be set on the basis of a congestion situation of each of the lanes L5 and L6, the speed of the host vehicle M, and the like.

[Processing Flow (Second Embodiment)]

FIG. 10 is a flowchart showing an example of branch lane shape estimation processing in a second embodiment.

In the processing of FIG. 10, the branch lane shape estimator 134 determines a shape or type of the branch section obtained from the recognition result of the recognizer 130 or the map information, and a start position (branch edge position) of each of a plurality of branch lanes present ahead of the branch section (step S142A). Next, the branch lane shape estimator 134 determines a point at which a width of the road in the branch section is maximized (step S142B). In the processing of step S142B, the branch lane shape estimator 134, for example, sets the branch edge position as a point at which the width is largest. Next, the action plan generator 150 generates a target trajectory from a center of the traveling lane at a start point of the branch section to a center of the edge position of the outermost branch lane among the plurality of branch lanes on the basis of, for example, the shape of the outermost demarcation line SL2 estimated by the branch lane shape estimator 134 (step S142C).

Next, the branch lane shape estimator 134 searches for a position at which a distance between the target trajectory toward the branch section start point from a point at which the width is maximized and the demarcation line demarcating the main lane side and the branch lane side satisfies the predetermined condition (step S142D), and determines the position (search position) satisfying the predetermined condition, which has been searched for, to be the number-of-lanes increase start position (step S142E). Next, the branch lane shape estimator 134 sets the center line of the traveling lane of the host vehicle M on the basis of the recognition result of the recognizer 130 or the map information (step S142F). Thus, the processing of this flowchart ends. The action plan generator 150 generates a target trajectory that passes through the number-of-lanes increase start position from the current position of the host vehicle M and travels in the branch lane, with the center of the lane being the ideal travel route at which the target trajectory aims. Thus, the processing of this flowchart ends.

According to the second embodiment described above, when a plurality of branch lanes are present after the branch section, search is performed in a direction of the start point of the branch section from the point at which the width of the road in the branch section becomes a maximum width (Wmax), and the number-of-lanes increase start position ISP2 is set so that a degree of interference between the target trajectories (center lines of the branch lanes) is reduced, making it possible for the occupant or surrounding vehicles to easily recognize which branch lane the host vehicle is directed to, in addition to achievement of the same effect as those in the first embodiment. This makes it possible to make the occupants feel safer, and to suppress occurrence of traffic congestion due to a behavior of the host vehicle M in the branch section.

Third Embodiment

Next, a third embodiment of the vehicle control device will be described. The third embodiment is different from the first and second embodiments in that the number-of-lanes increase position searcher 134a determines a position at which an increase in the number of lanes ends (the number-of-lanes increase end position), instead of determining the number-of-lanes increase start position. Further, the third embodiment is different in that the target trajectory is generated so that a course change to the branch lane in which the host vehicle M travels until the host vehicle M reaches the determined number-of-lanes increase end position is completed. Therefore, the following description will focus mainly on the above differences, and other descriptions will be omitted. Since the configuration of the vehicle system 1 similar to that of the first embodiment can be applied to the third embodiment, the configuration of the vehicle system 1 described above will be used in the following description.

In the third embodiment, the number-of-lanes increase position searcher 134a has a different search direction or search conditions for the number-of-lanes increase end position depending on a road shape in the branch section. Therefore, a method of determining the number-of-lanes increase end position for each road shape pattern will be described hereinafter.

<First Road Shape Pattern>

Figure 11:
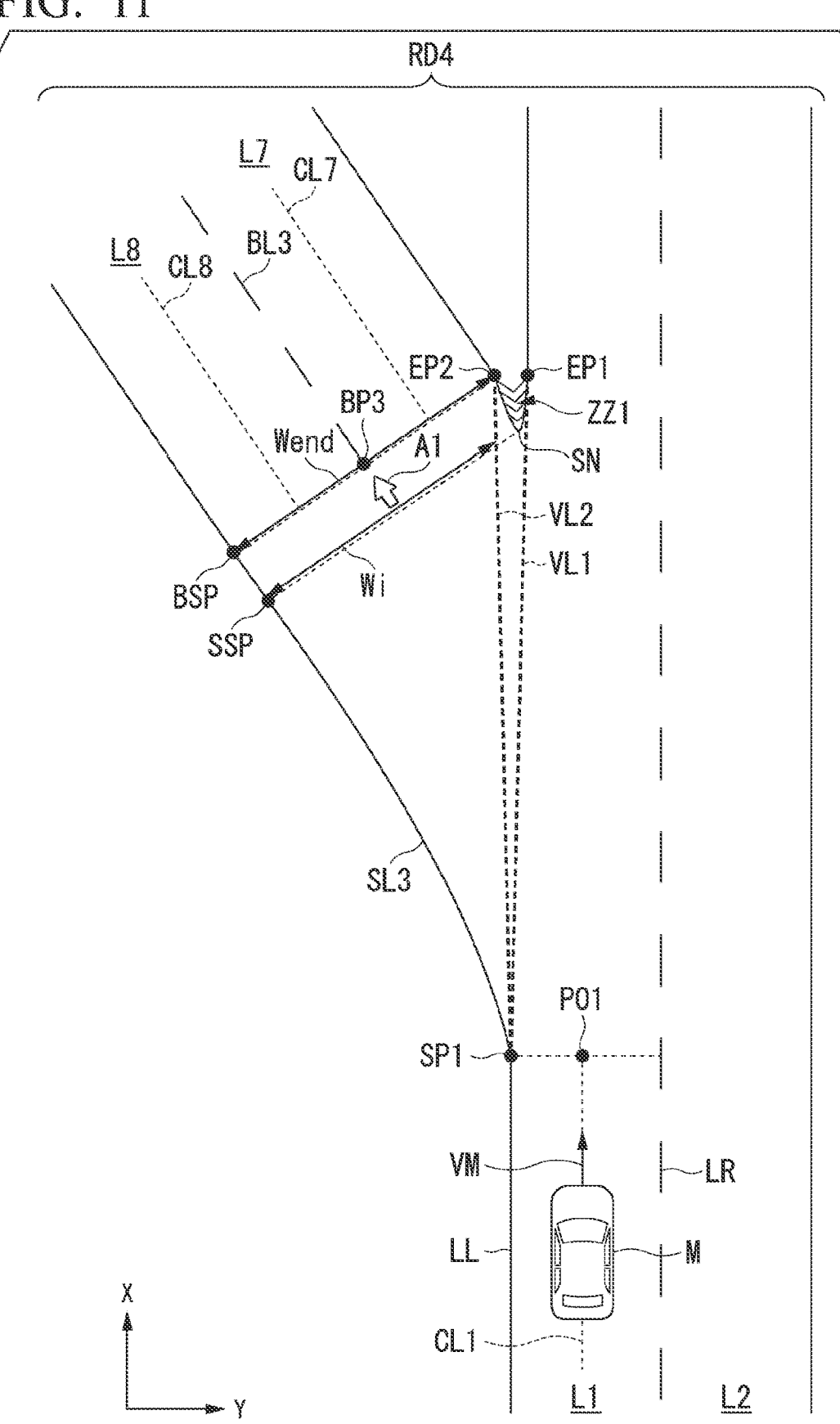
FIG. 11 is a diagram for describing a method of determining a number-of-lanes increase end position in a first road shape pattern.

FIG. 11 is a diagram for describing a method of determining the number-of-lanes increase end position in a first road shape pattern. An example of FIG. 11 shows a road RD4 having main lanes L1 and L2 and two branch lanes L7 and L8. In the example of FIG. 11, it is assumed that there are one branch section start point SP1 and two branch section end points EP1 and EP2, and the virtual demarcation line VL1 linearly connecting the branch section start point SP1 to the branch section end point EP1 and the virtual demarcation line VL2 linearly connecting the branch section start point SP1 to the branch section end point EP2 are set by the virtual demarcation line setter 132. Further, it is assumed in the example of FIG. 11 that the branch section end points EP1 and EP2 are hard noses, and a soft nose SN is present ahead of the branch section end points EP1 and EP2 (on the branch section start point SP1 side or on the host vehicle M side). A zebra zone ZZ1 is provided in a region from the soft nose SN to the branch section end points EP1 and EP2. In the example of FIG. 11, it is assumed that the host vehicle M is traveling in the lane L1 at the speed VM toward the branch section.

Here, the first road shape pattern is a road shape in which a search start position SSP of the number-of-lanes increase end position is present on the branch section start point SP1 side (the host vehicle M side) rather than the road position BSP at which there is an edge (branch edge position) BP3 of a demarcation line BL3 that demarcates the lanes L7 and L8. The search start position SSP is, for example, a straight line parallel to a straight line passing through the branch section end point EP2 on the branch lane side and the branch edge position BP3 (a straight line in the lateral width direction of the branch lane), which is a point passing through the soft nose SN. In the case of the first road shape pattern, the number-of-lanes increase position searcher 134a searches for a point at which a distance (road width) Wi from an outermost demarcation line SL3 estimated by the branch lane shape estimator 134 to the virtual demarcation line VL2 on the branch lane side satisfies a first condition toward a road position BSP direction in which there is the branch edge position BP3 (a direction indicated by an arrow A1 in the figure) from the search start position SSP, and determines the point at which the distance satisfies the first condition to be the number-of-lanes increase end position.

Here, the first condition is, for example, that the road width Wi is within a predetermined error range with respect to a road width Wend at the road position BSP of the branch edge position BP3, and for example, a condition "0.9Wend<Wi<1.1Wend" is satisfied. The numerical values are not limited to 0.9 and 1.1, and may be set variably on the basis of, for example, the shape of the road and the number of lanes.

Figure 12:
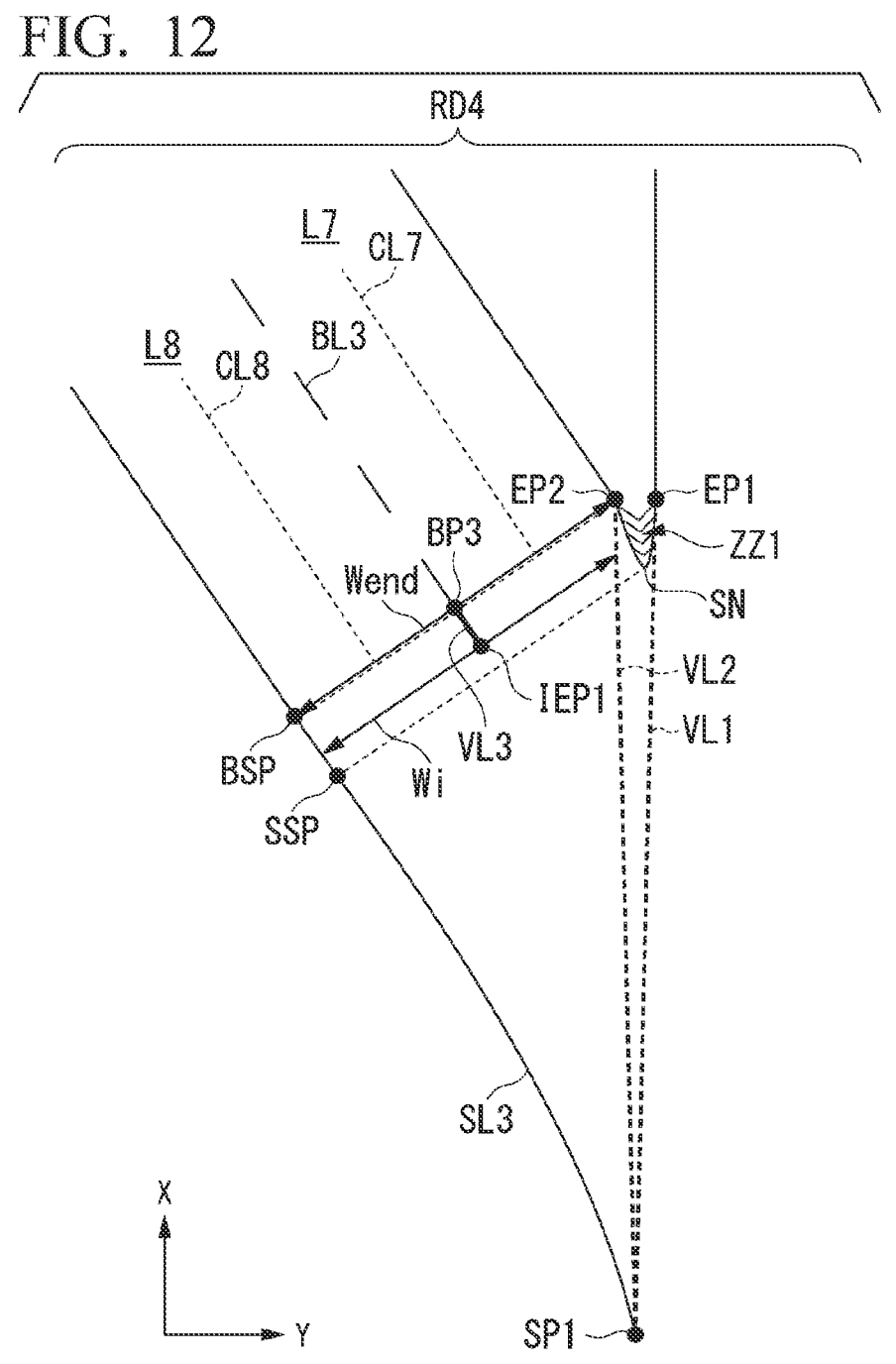

FIG. 12 is a diagram for describing a number-of-lanes increase end position IEP1 determined in the first road shape pattern. In the example of FIG. 12, the vicinity of the number-of-lanes increase end position IEP1 in FIG. 11 is shown in an enlarged manner. The number-of-lanes increase position searcher 134a extends the demarcation line BL3 from the branch edge position BP3 toward the branch section start point SP1, and determines a position overlapping the point at which the road width Wi satisfies the first condition, to be the number-of-lanes increase end position IEP1. The number-of-lanes increase position searcher 134a sets a virtual demarcation line VL3 that connects the branch edge position BP3 to the number-of-lanes increase end position IEP1. The number-of-lanes increase position searcher 134a may extend each of a center CL7 of the lane L7 and a center CL8 of the lane L8 to the number-of-lanes increase end position IEP1.

After the number-of-lanes increase position searcher 134a determines the number-of-lanes increase end position IEP1, the route generator 156 generates a target trajectory for causing the host vehicle M to travel in the lane L7 or L8 from the lane L1. In this case, the route generator 156 generates the target trajectory so that the host vehicle M travels at a center of the lane L7 or L8 when the host vehicle M has reached the number-of-lanes increase end position IEP1.

Thus, in the first road shape pattern, since the number-of-lanes increase end position IEP1 is set on the branch section start position side rather than the branch edge position BP3, it is possible to position the host vehicle M faster at the center position of the branch lane. Therefore, it is possible for the occupant or surrounding vehicles to more rapidly ascertain the lane in which the host vehicle M travels. Although the example in which the width of the road gradually increases has been shown in FIGS. 11 and 12, the number-of-lanes increase end position IEP1 is determined on the basis of the first condition, and the target trajectory is generated so that the host vehicle M travels at a center of the branch lane at a point in time when the host vehicle M has reached the number-of-lanes increase end position IEP1, making it possible to execute more appropriate driving control, as in the case in which the width of the road gradually decreases.

<Second Road Shape Pattern>

Figure 13:
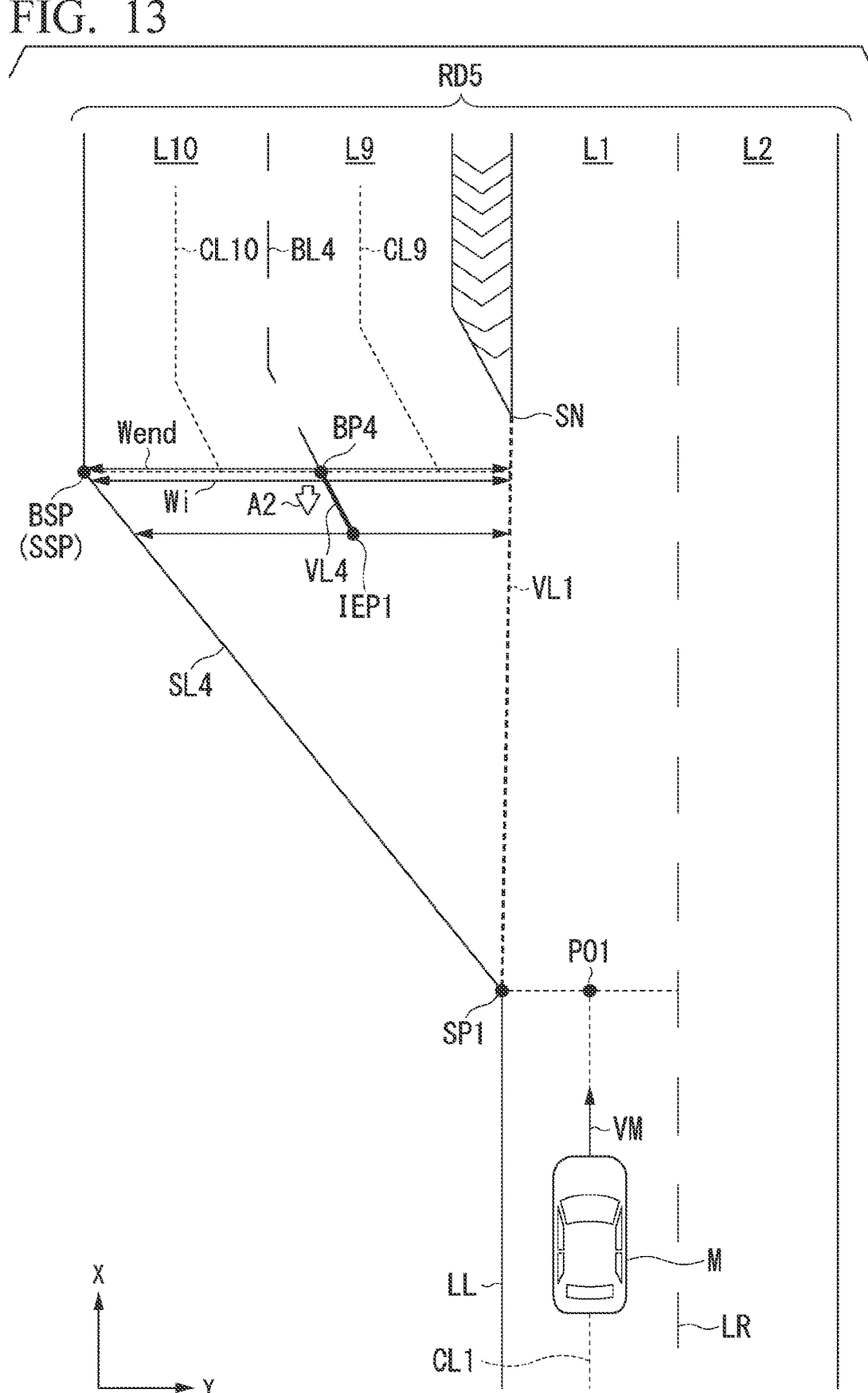
FIG. 13 is a diagram for describing a method of determining a number-of-lanes increase end position in a second road shape pattern.

FIG. 13 is a diagram for describing a method of determining the number-of-lanes increase end position in a second road shape pattern. An example of FIG. 13 shows a road RD5 having main lanes L1 and L2 and two branch lanes L9 and L10. In the example of FIG. 13, it is assumed that there are one branch section start point SP1 and the soft nose SN, and the virtual demarcation line setter 132 sets the virtual demarcation line VL1 that linearly connects the branch section start point SP1 to the soft nose SN. A branch section end point may be used instead of the soft nose SN. In the example of FIG. 13, it is assumed that the host vehicle M is traveling along the lane L1 at the speed VM toward the branch section.

Here, the second road shape pattern is a road shape in which an edge (branch edge position) BP4 of a demarcation line BL4 that demarcates the lanes L9 and L10 is present on the branch section start point SP1 side (host vehicle M side) rather than the soft nose SN. In this case, since a position of the soft nose SN satisfies the first condition, the number-of-lanes increase end position IEP1 is set on the inner side with respect to the current branch edge position BP4 when viewed from the host vehicle M. Therefore, in the case of the second road shape pattern as shown in FIG. 13, the road position BSP at which there is the branch edge position BP4 is set as the search start position SSP, a point at which a distance (road width) Wi from an outermost demarcation line SL4 estimated by the branch lane shape estimator 134 to the virtual demarcation line VL1, from the search start position SSP toward the branch section start point SP1 (a direction indicated an arrow A2 in the figure), satisfies a second condition is searched for, and the point at which the distance satisfies the condition is determined to be the number-of-lanes increase end position.

Here, the second condition is, for example, that the road width Wi exceeds a predetermined error range with respect to a road width Wend at the road position BSP of the branch edge position BP4, and for example, a condition "Wi<0.9Wend or Wi>1.1Wend" is satisfied. The numerical values are not limited to 0.9 and 1.1, and may be set variably on the basis of, for example, the shape of the road and the number of lanes. In the example of FIG. 13, since the width of the road gradually decreases from the road position BSP toward the branch section start point SP1 (a direction indicated by an arrow A2 in the figure), a position satisfying the search result "Wi<0.9Wend" is determined as the number-of-lanes increase end position IEP1. When the width of the road gradually increases from the road position BSP toward the branch section start point SP1, a position satisfying "Wi>1.1Wend" is determined as the number-of-lanes increase end position IEP1.

The number-of-lanes increase position searcher 134a sets a virtual demarcation line VL4 that connects the branch edge position BP4 to the number-of-lanes increase end position IEP1. The number-of-lanes increase position searcher 134a may extend each of a center line CL9 of the lane L9 and a center line CL10 of the lane L10 to the number-of-lanes increase end position IEP1.

After the number-of-lanes increase position searcher 134a determines the number-of-lanes increase end position IEP1, the route generator 156 generates a target trajectory for causing the host vehicle M to travel in the lane L9 or L10 from the lane L1. In this case, the route generator 156 generates the target trajectory so that the host vehicle M travels at a center of the lane L9 or L10 when the host vehicle M has reached the number-of-lanes increase end position IEP1.

Thus, even in the second road shape pattern, since the number-of-lanes increase end position IEP1 is set on the branch section start position side rather than the branch edge position BP4, it is possible to position the host vehicle M faster at the center position of the branch lane.

Even in the case of road shape patterns other than the first and second road shape patterns, search from the search start position SSP is performed on the basis of the first condition and the second condition described above and the search direction, making it possible to set the number-of-lanes increase end position IEP1 at a position before the branch edge position BP4. In the third embodiment, the number-of-lanes increase position searcher 134a may change the search direction or conditions depending on which position is set as the search start position SSP. The number-of-lanes increase position searcher 134a, for example, may perform search using the second condition when there is no position satisfying the first condition in the search in the search direction, or conversely, may perform search using the first condition when there is no position satisfying the second condition.

[Processing Flow (Third Embodiment)]

Figure 14:
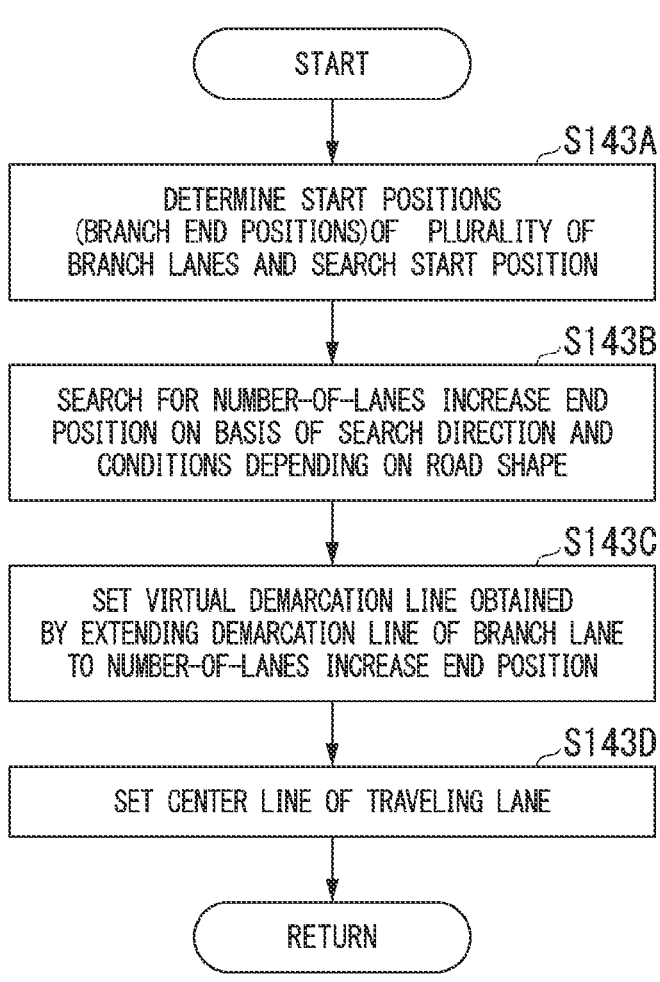
FIG. 14 is a flow chart showing an example of processing for estimating a branch lane shape according to a third embodiment.

FIG. 14 is a flowchart showing an example of branch lane shape estimation processing in a third embodiment.

In the processing of FIG. 14, the branch lane shape estimator 134 determines start positions (branch edge positions) of a plurality of branch lanes and the search start position (step S143A). Next, branch lane shape estimator 134 searches for the number-of-lanes increase end position on the basis of the search direction and conditions (the first condition or the second condition) depending on the road shape in the branch section (step S143B). Next, the branch lane shape estimator 134 sets the virtual demarcation line obtained by extending the demarcation line of the branch lane to the number-of-lanes increase end position (step S143C). Next, the branch lane shape estimator 134 sets the center line of the traveling lane of the host vehicle M on the basis of the recognition result of the recognizer 130 or the map information (step S143D). Thus, the processing of this flowchart ends. The action plan generator 150 regards the center of the lane as the ideal travel route at which the target trajectory aims, and generates a target trajectory that travels at the center of the branch lane from the current position of the host vehicle M to the edge (the number-of-lanes increase end position) of the virtual demarcation line.

According to the third embodiment described above, the number-of-lanes increase end position is set on the branch section start point side rather than the branch edge position, and the target trajectory is generated so that the host vehicle M can travel in the center of the branch lane at a point in time when the host vehicle M reaches the set number-of-lanes increase end position, making it possible for the occupant or surrounding vehicles to easily ascertain the branch lane in which the host vehicle M travels in the branch section, in addition to achievement of the same effects as the first embodiment. According to the third embodiment, it is possible to further reduce interference between the target trajectories to the respective branch lanes, as in the second embodiment.

Modification Example

Each of the first to third embodiments described above may be a combination with some or all of other embodiments. For example, for schemes for determining the number-of-lanes increase start position in the first embodiment and the second embodiment, for example, any one of the determination schemes may be selectively switched depending on the road shape in the branch section, the number of branch lanes, and the like to determine the number-of-lanes increase start position, and a center position (average value) of number-of-lanes increase start positions obtained by the respective determination schemes may be used as a final number-of-lanes increase start position.

The first or second embodiment may be combined with the third embodiment to determine the number-of-lanes increase start position and the number-of-lanes increase end position and generate a target trajectory to the branch lane in the branch section on the basis of the respective determined positions. In this case, the action plan generator 150 may generate, for example, the target trajectory on the basis of a position whose predetermined priority is high between the determined number-of-lanes increase start position and the number-of-lanes increase end position. This makes it possible to cause the host vehicle M to travel along a more appropriate route in the branch section.

In the embodiment, the recommendation start determiner 142 may cause the HMI controller 170 to inquire of the occupant at a predetermined timing about whether or not the target trajectory based on the number-of-lanes increase start position or the number-of-lanes increase end position is to be generated. In this case, the action plan generator 150 may generate the target trajectory on the basis of an inquiry result. This makes it possible to cause the host vehicle M to travel along the trajectory desired by the occupant, and to further reduce discomfort felt by the occupant.

The embodiment described above can be expressed as follows.

A vehicle control device includes a storage medium that stores computer-readable instructions; and a processor connected to the storage medium, wherein the processor executes the computer-readable instructions to:

recognize a surroundings situation of a host vehicle on the basis of information obtained from at least one of a detection device and map information;

generate a target trajectory for the host vehicle on the basis of a recognition result, and execute driving control for controlling one or both of speed and steering of the host vehicle so that the host vehicle travels along the generated target trajectory;

generate the target trajectory so that a degree of interference between a demarcation line demarcating the main line side and the branch lane side and the target trajectory of the host vehicle is reduced when the host vehicle is caused to perform course change from the main line side to the branch lane side in a branch section in which a main line and a branch lane are connected.

Although the embodiments for carrying out the present invention have been described above using the embodiments, the present invention is not limited to these embodiments and various modifications and substitutions can be made without departing from the gist of the present invention.

What is claimed is:

1. A vehicle control device comprising:

a processor that executes instructions to:

recognize, as a recognition result, a surroundings situation of a host vehicle on the basis of information obtained from at least one of a detection device and map information; and generate a target trajectory for the host vehicle on the basis of the recognition result, and control one or both of speed and steering of the host vehicle so that the host vehicle travels along the generated target trajectory, wherein the processor generates the target trajectory so that interference between a demarcation line demarcating a main line side and a branch lane side and the target trajectory of the host vehicle is reduced when the host vehicle is caused to perform course change from the main line side to the branch lane side in a branch section in which the main line side and the branch lane side are connected, wherein, reducing the interference between the demarcation line and the target trajectory is preventing the host vehicle traveling along the target trajectory from traveling on the demarcation line, or to ensure a distance between the demarcation line and the target trajectory to a predetermined distance or more is maintained, wherein the processor determines a number-of-lanes increase start position in the branch section on a basis of a road shape at the branch section, and generates the target trajectory passing through the number-of-lanes increase start position from a position of the host vehicle so that the host vehicle ultimately travels in a center of the branch lane, wherein the processor determines a number-of-lanes increase in the position in the branch section, and generates the target trajectory so that the target trajectory passes through the number-of-lanes increase start position and the number-of-lanes increase end position and reaches the branch lane, wherein the number-of-lanes increase end position is set to a position at which a degree of interference between target trajectories for travel in respective branch lanes is reduced when there are a plurality of branch lanes.

2. The vehicle control device according to claim 1, wherein the processor sets a virtual demarcation line on the branch lane side on the basis of information on the demarcation line on the main line side in the branch section when the processor does not recognize the demarcation line demarcating the main lane side and the branch lane side, and the processor generates a target trajectory for the host vehicle so that the interference with the virtual demarcation line is reduced.

3. The vehicle control device according to claim 1, wherein the processor generates the target trajectory so that the interference between respective target trajectories for the course change from the main lane side to respective branch lanes is reduced when there are a plurality of branch lanes.

4. The vehicle control device according to claim 1, wherein the number-of-lanes increase start position is a position in which a distance from the demarcation line demarcating the main lane side in the branch lane side in the branch section is equal to or larger than a predetermined value.

5. The vehicle control device according to claim 4, wherein the predetermined value is half a width of the host device.

6. A vehicle control method comprising:

recognizing, by a computer, a surroundings situation of a host vehicle on the basis of information obtained from at least one of a detection device and map information;

generating, by the computer, a target trajectory for the host vehicle on the basis of a recognition result representing the surroundings situation, and executing driving control for controlling one or both of speed and steering of the host vehicle so that the host vehicle travels along the generated target trajectory;

generating, by the computer, the target trajectory so that interference between a demarcation line demarcating a main line side and a branch lane side and the target trajectory of the host vehicle is reduced when the host vehicle is caused to perform course change from the main line side to the branch lane side in a branch section in which the main line side and a branch lane side are connected;

wherein, reducing the interference between the demarcation line and the target trajectory is preventing the host vehicle traveling along the target trajectory from traveling on the demarcation line, or to ensure a distance between the demarcation line and the target trajectory maintains a predetermined distance or more;

determining, by the computer, a number-of-lanes increase start position in the branch section on the basis of a road shape in the branch section, and generating a target trajectory passing through the number-of-lanes increase start position from a position of the host vehicle so that the host vehicle ultimately travels in a center of the branch lane;

determining, by the computer, a number-of-lanes increase end position in the branch section; and generating, by the computer, the target trajectory so that the target trajectory passes through the number-of-lanes increase start position and the number-of-lanes increase end position and reaches the branch lane;

wherein the number-of-lanes increase end position is set to a position at which a degree of interference between target trajectories for travel in respective branch lanes is reduced when there are a plurality of branch lanes.

7. A computer-readable non-transitory storage medium having a program stored therein, the program causing a computer to:

recognize a surroundings situation of a host vehicle on the basis of information obtained from at least one of a detection device and map information;

generate a target trajectory for the host vehicle on the basis of a recognition result representing the surroundings situation, and execute driving control for controlling one or both of speed and steering of the host vehicle so that the host vehicle travels along the generated target trajectory;

generate the target trajectory so that interference between a demarcation line demarcating a main line side and a branch lane side and the target trajectory of the host vehicle is reduced when the host vehicle is caused to perform course change from the main line side to the branch lane side in a branch section in which the main line side and branch lane side are connected;

wherein, reducing the interference between the demarcation line and the target trajectory is preventing the host vehicle traveling along the target trajectory from traveling on the demarcation line, or to ensure a distance between the demarcation line and the target trajectory to a predetermined distance or more;

determine a number-of-lanes increase start position in the branch section on the basis of a road shape in the branch section, and generate a target trajectory passing through the number-of-lanes increase start position from a position of the host vehicle and traveling in a center of the branch lane;

determine a number-of-lanes increase end position in the branch section; and generate the target trajectory so that the target trajectory passes through the number-of-lanes increase start position and the number-of-lanes increase end position and reaches the branch lane;

wherein the number-of-lanes increase end position is set to a position at which a degree of interference between target trajectories for travel in respective branch lanes is reduced when there are a plurality of branch lanes.

* * * * *